United States Patent
Lafreniere et al.

(10) Patent No.: US 11,579,704 B2
(45) Date of Patent: Feb. 14, 2023

(54) SYSTEMS AND METHODS FOR ADAPTIVE INPUT THRESHOLDING

(71) Applicant: META PLATFORMS TECHNOLOGIES, LLC, Menlo Park, CA (US)

(72) Inventors: Benjamin Lafreniere, Toronto (CA); Tanya Renee Jonker, Seattle, WA (US); Stephanie Santosa, Toronto (CA); Hrvoje Benko, Seattle, WA (US); Daniel John Wigdor, Toronto (CA)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/211,754

(22) Filed: Mar. 24, 2021

(65) Prior Publication Data
US 2022/0308675 A1 Sep. 29, 2022

(51) Int. Cl.
*G06F 3/01* (2006.01)

(52) U.S. Cl.
CPC .................. *G06F 3/017* (2013.01)

(58) Field of Classification Search
None
See application file for complete search history.

(56) References Cited

U.S. PATENT DOCUMENTS

| | | | |
|---|---|---|---|
| 2010/0306712 A1* | 12/2010 | Snook | G06F 3/017 715/863 |
| 2011/0173204 A1 | 7/2011 | Murillo et al. | |
| 2012/0323521 A1* | 12/2012 | De Foras | G06F 3/0346 702/141 |
| 2013/0328787 A1* | 12/2013 | Stearns | G06F 3/04847 345/173 |
| 2015/0331534 A1* | 11/2015 | Feng | G06F 3/017 345/173 |
| 2016/0086500 A1* | 3/2016 | Kaleal, III | A61B 5/43 434/257 |
| 2018/0299996 A1 | 10/2018 | Kugler et al. | |
| 2018/0335921 A1* | 11/2018 | Karunamuni | G06F 3/0485 |

OTHER PUBLICATIONS

Katsuragawa et al., "Bi-Level Thresholding: Analyzing the Effect of Repeated Errors in Gesture Input", ACM Transactions on Interactive Intelligent Systems, vol. 9, No. 2-3, Article 15, Mar. 2019, pp. 1-30.

Banovic et al., "The Effect of Time-based Cost of Error in Target-directed Pointing Tasks", CHI 2013: Changing Perspectives, Paris, France, Apr. 27-May 2, 2013, pp. 1373-1382.

(Continued)

*Primary Examiner* — Parul H Gupta
(74) *Attorney, Agent, or Firm* — Greenberg Traurig, LLP

(57) ABSTRACT

The disclosed computer-implemented method may include detecting, by a computing system, a gesture that appears to be intended to trigger a response by the computing system, identifying, by the computing system, a context in which the gesture was performed, and adjusting, based at least on the context in which the gesture was performed, a threshold for determining whether to trigger the response to the gesture in a manner that causes the computing system to perform an action that is based on the detected gesture.

20 Claims, 17 Drawing Sheets

(56) References Cited

OTHER PUBLICATIONS

Horvitz, Eric, "Principles of Mixed-Initiative User Interfaces", Microsoft Research, Papers, CHI 99, May 15-20, 1999, pp. 159-166.

Goyal et al., "Actively-learning Real-time Hand Gesture RecognitionSystem for Personalized Static Gestures", URL: https://sites.google.com/a/vt.edu/talk2thehand/, Talk2dHand Computer Vision: Class Project Virginia Tech, 2015, pp. 1-9.

International Search Report and Written Opinion for International Application No. PCT/US2022/021719, dated Jul. 8, 2022, 11 pages.

\* cited by examiner

SYSTEMS AND METHODS FOR ADAPTIVE INPUT THRESHOLDING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
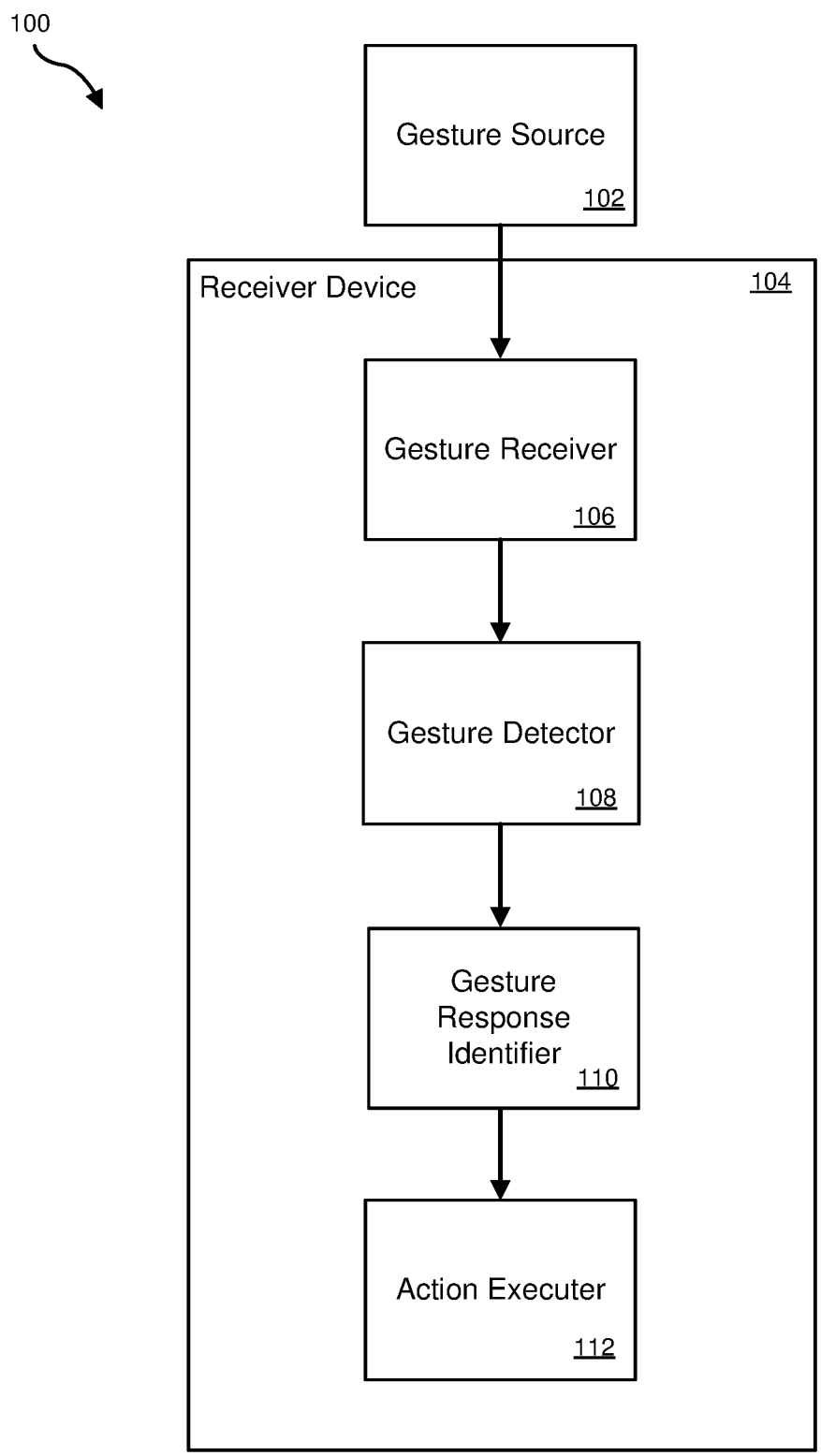
FIG. 1 is an illustration of an example block diagram of system for detecting and responding to a gesture.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A user may interact with a computing device in a variety of ways to provide input to, or otherwise control, actions performed by the computing device. For example, the user may type on a keyboard, which may be a mechanical keyboard interfaced with the computing device or a virtual keyboard that may be a keyboard displayed on a touchscreen of a display device of the computing device. The user may use a pointing device (e.g., a mouse) to click-on or select a button or icon displayed on the display device of the computing device. The user may interact with buttons, icons, and/or other controls provided on a touchscreen of the computing device. The user may use voice controls by speaking voice commands into a microphone of the computing device.

In addition, or in the alternative, the computing device may recognize and interpret one or more gestures performed by the user that may provide control of the computing device. In some cases, the user may perform the gesture while contacting the computing device (e.g., swiping a finger of the user across the screen of the computing device). In other cases, the user may perform the gesture without necessarily making any physical contact with the computing device.

In some circumstances, the user may be interacting with a computing device while doing other activities, while under duress, or while under circumstances that provide less than optimal conditions for the interaction. Such circumstances may cause the user to inaccurately provide input to the computing device causing the computing device to misinterpret the intentions of the user. In addition, or in the alternative, the circumstances may cause the computing device to misinterpret the intentions of the user. These misinterpretations may cause the computing device to erroneously accept or reject input to the computing device causing the computing device to perform an action in error and/or to not perform an action in error, respectively. In other circumstances, the user may be interacting with a computing device and noise or other types of interference may be introduced making it difficult for the computing device to correctly interpret the intentions of the user even if the user accurately provided input to the computing device.

In order to create an optimal user experience, a confidence threshold for use by the computing device for accepting or rejecting input to the computing device may be adaptively adjusted based on the temporal costs of correcting actions performed in error based on user input misinterpreted by the computing device.

The present disclosure is generally directed to adaptive input thresholding for the recognition of a gesture as an input to a computing device based on the temporal costs of error correction and/or user tasks. As will be explained in greater detail below, embodiments of the present disclosure may provide a computing system that may detect a gesture that appears to be intended to trigger a response by the computing system.

Once detected, the computing system may identify a context in which the gesture was performed. An example context may be a number of applications actively running on the computing device of the user when the gesture is detected. This context may indicate a degree of multitasking by the user when performing the gesture (e.g., the more applications that are actively running the greater the degree of multitasking). Another example context may be a current activity level of the interaction of the user with the application when the gesture is detected. This context may indicate a degree of time pressure that the user was under when performing the gesture (e.g., the higher the activity level the greater the degree of time pressure).

Based at least on the context in which the gesture was performed, a threshold for determining whether to trigger the response to the gesture may be adjusted. Referring to the above examples, for example, the degree of multitasking and/or the degree of time pressure may adjust a threshold for determining a recognition of the gesture and its associated response. Triggering the response may then cause the computing system to perform an action that is based on the detected gesture.

In addition, or in the alternative, the triggering of the response may be further based on the temporal costs of performing the action in error (a false positive) and/or the temporal costs of not performing the action in error (a false negative). Therefore, the computing system may determine a confidence level or score in association with the detected gesture based on the context in which the gesture was performed and the temporal costs of error correction of performing or not performing an action based on the detected error.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
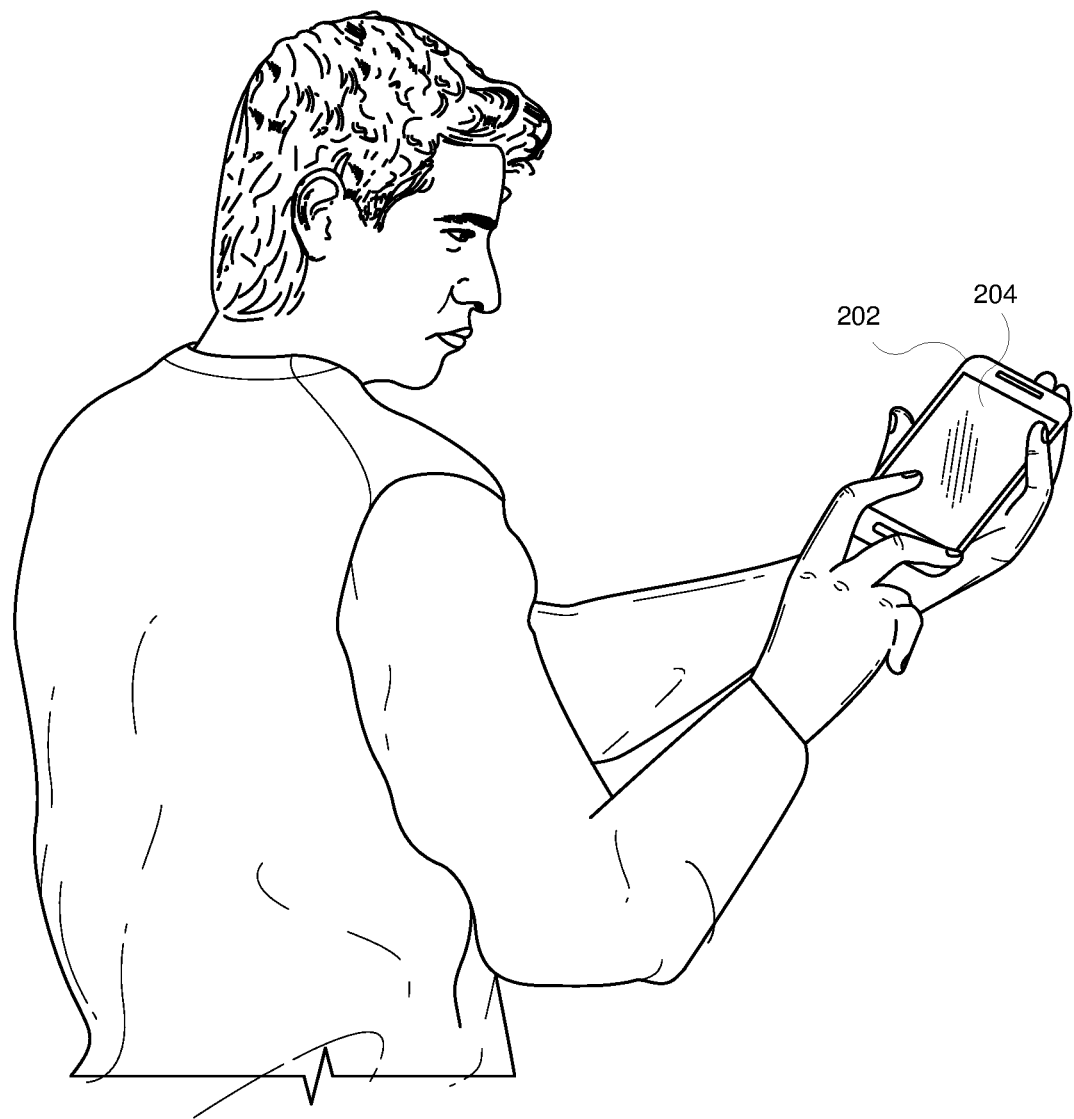
FIG. 2 is an illustration of an example gesture source included in an example receiving device.
Figure 3:
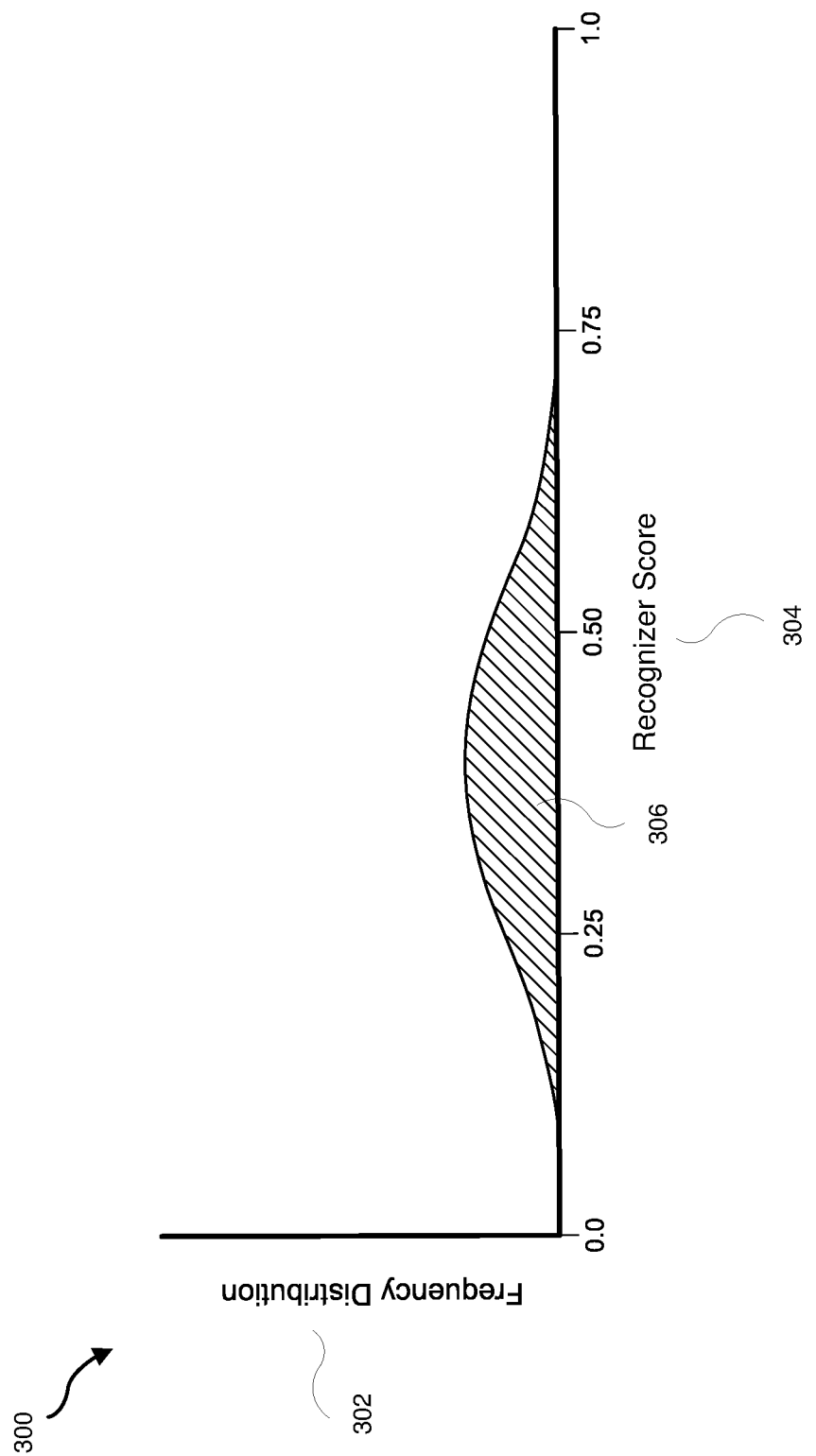
FIG. 3 is an illustration of a first example graph of a frequency distribution for an input gesture versus a recognizer score.
Figure 4:
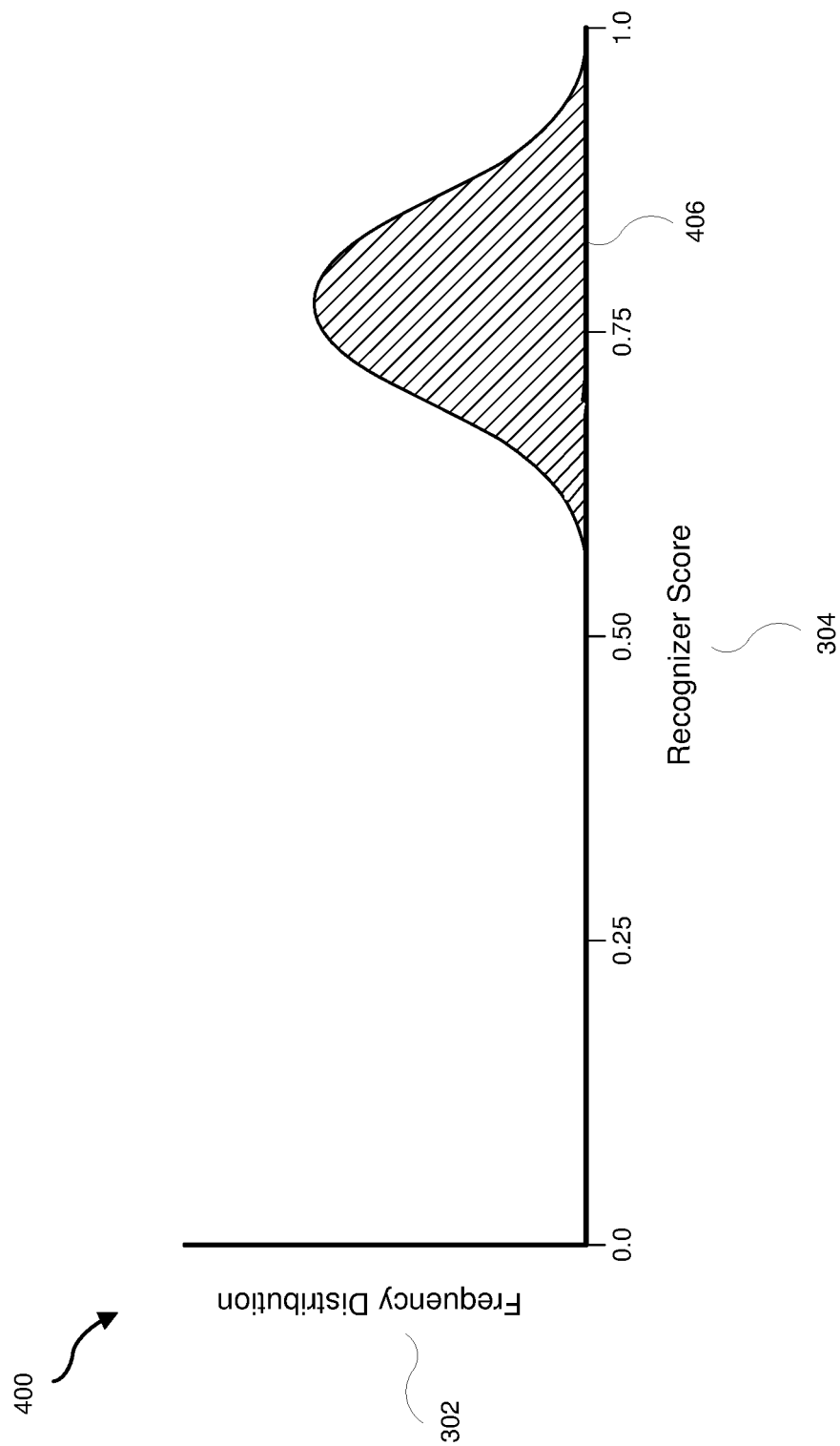
FIG. 4 is an illustration of a second example graph of a frequency distribution for an input gesture versus a recognizer score.
Figure 5:
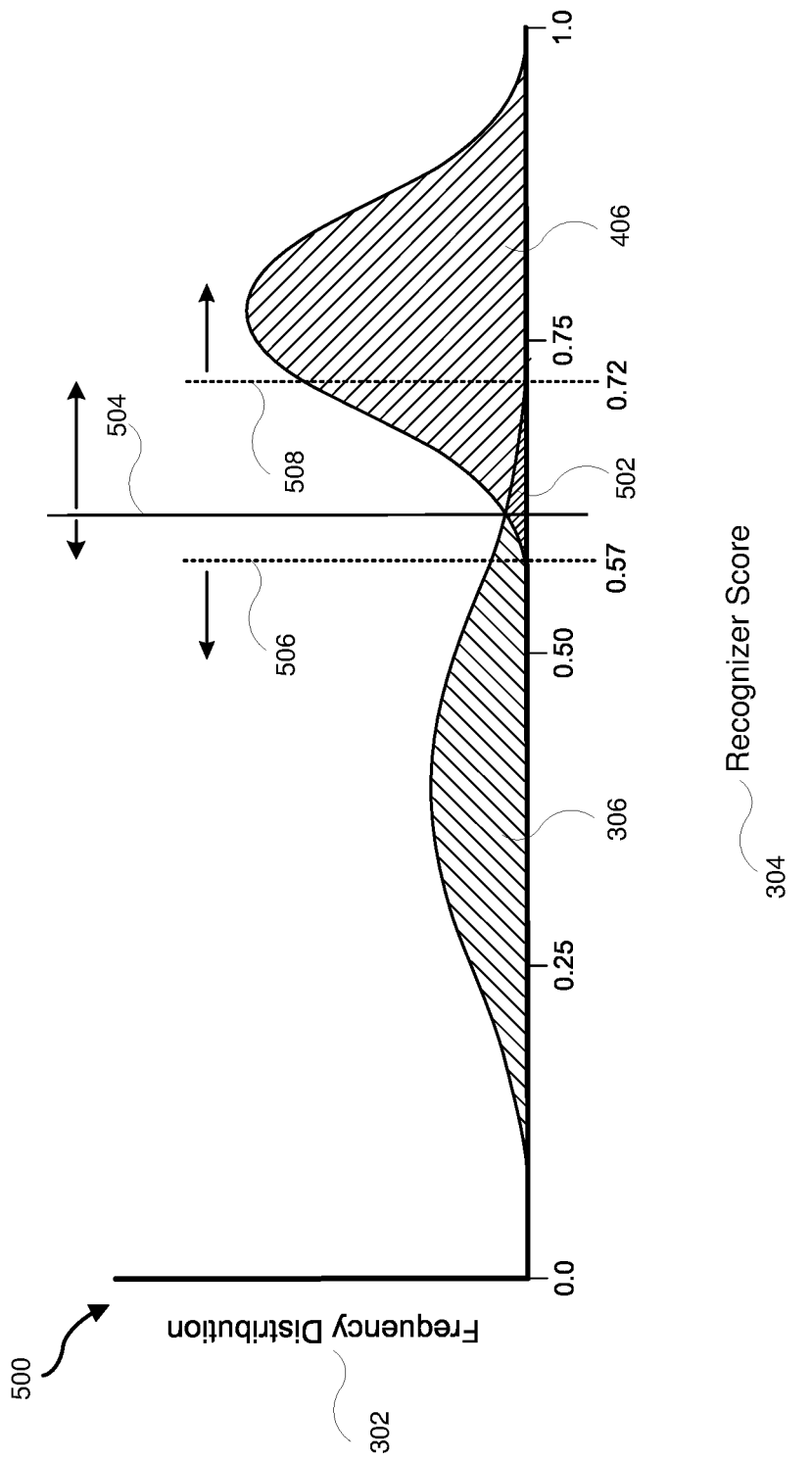
FIG. 5 is an illustration of a third example graph of a frequency distribution for an input gesture versus a recognizer score.
Figure 6:
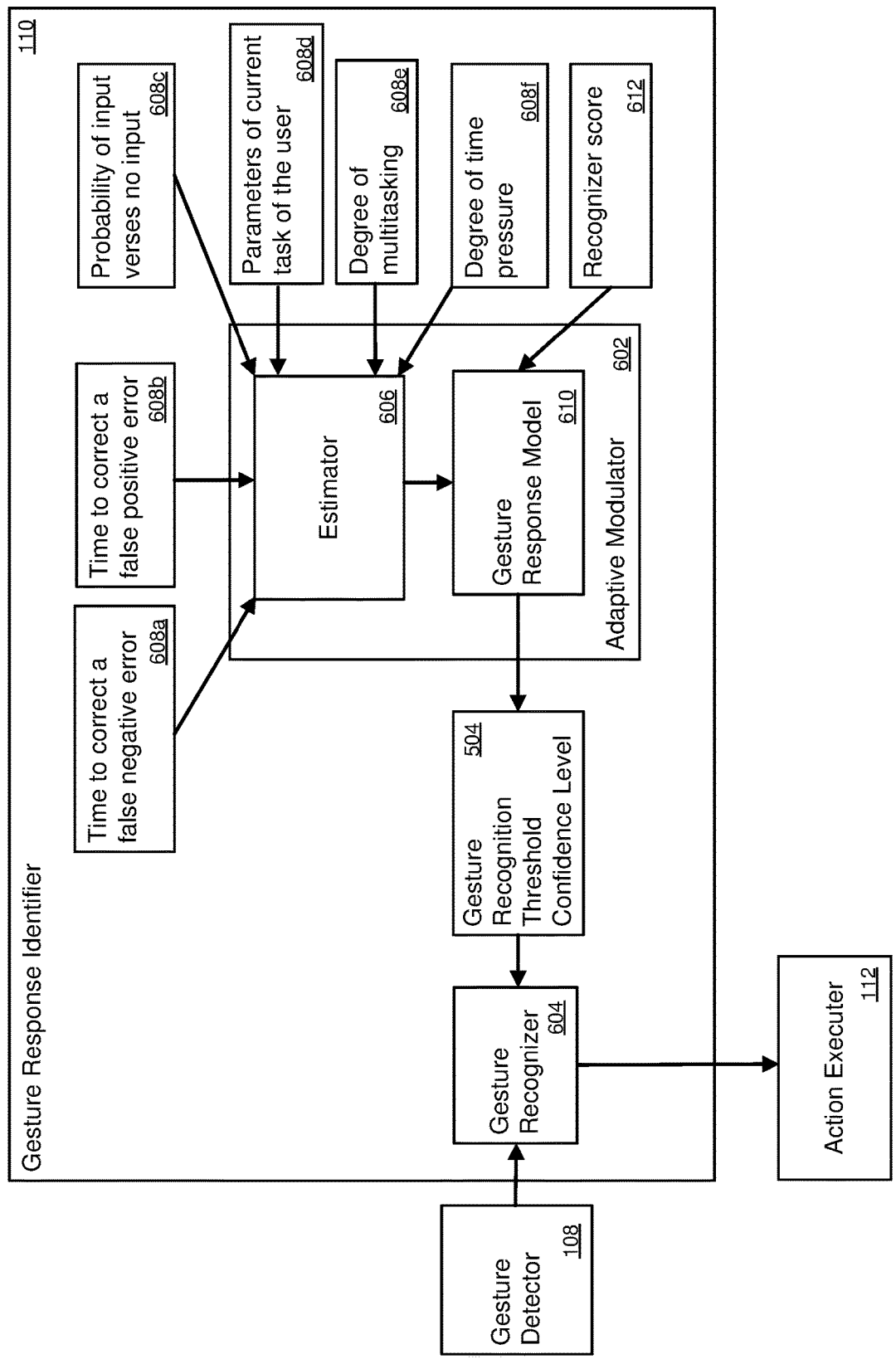
FIG. 6 is an illustration of an example block diagram of a gesture response identifier.
Figure 7:
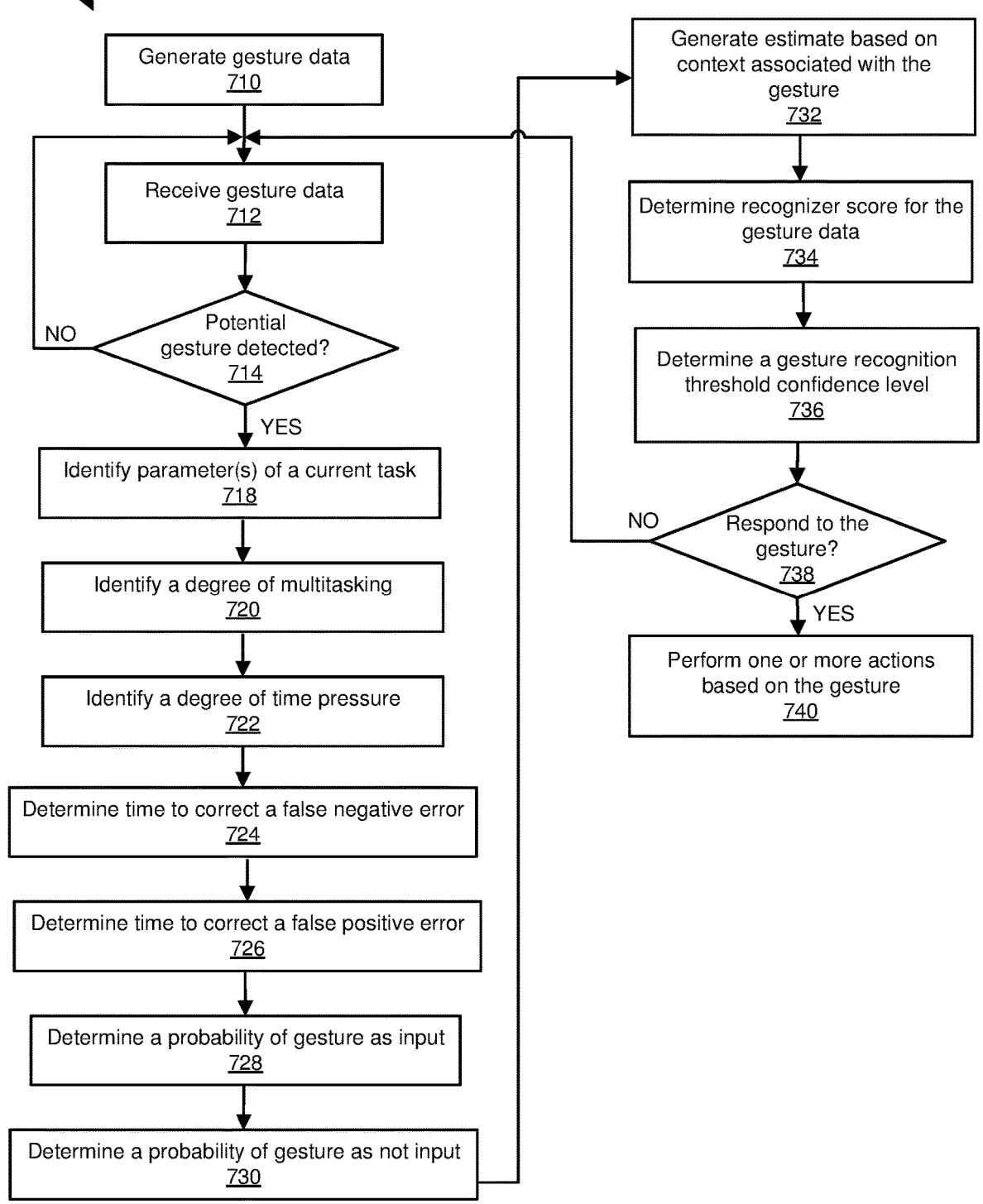
FIG. 7 is a flow diagram of an exemplary computer-implemented method 700 for recognizing and responding to an intended gesture.
Figure 8:
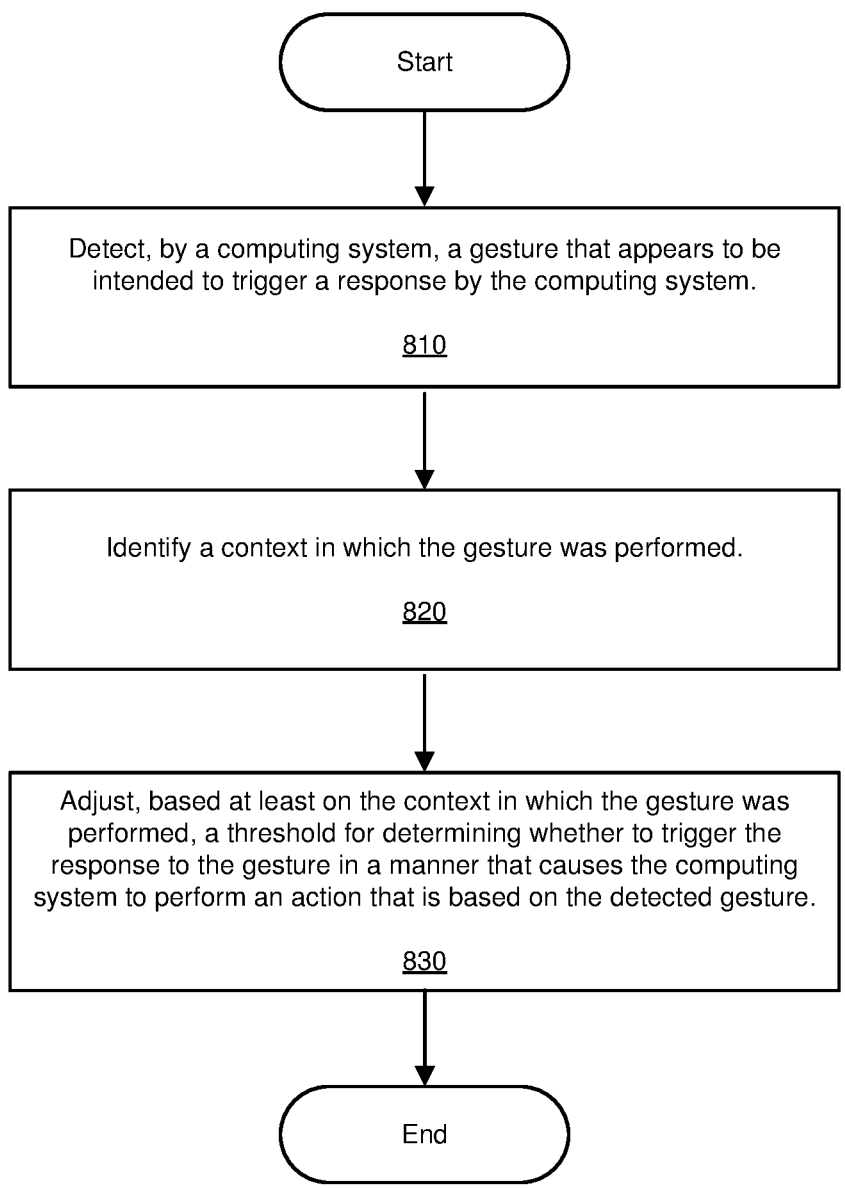
FIG. 8 is a flow diagram of an exemplary method for adaptive input thresholding based on the temporal costs of error correction and/or user tasks.

The following will provide, with reference to FIGS. 1 and 6, an exemplary system for recognizing and responding to gestures, with reference to FIGS. 3-5, exemplary graphs of a frequency distribution for an input gesture versus a recognizer score, and with reference to FIGS. 7 and 8, exemplary methods for recognizing and responding to an intended gesture using adaptive input thresholding based on the temporal costs of error correction and/or user tasks. FIGS. 2 and 12-17 provide examples of systems, devices, and environments that may incorporate the use of the exemplary system for recognizing and responding to gestures.

FIG. 1 is an illustration of an example block diagram of a system 100 for detecting and responding to a gesture. The system 100 may include a gesture source 102 and a receiving device 104. In some implementations, the gesture source 102 and the receiving device 104 may be different devices. In some cases, the gesture source 102 may be physically connected to the receiving device 104 for communication purposes. In some cases, the gesture source 102 may be wirelessly connected to the receiving device 104. In some implementations, the receiving device 104 may include the gesture source 102. For example, the gesture source 102 may be included within or be physically a part of the receiving device 104.

Gestures as referred to herein may be motion gestures, which are gestures made by a user of a gesture source without the user making any direct physical contact with a receiving device when performing the gesture. Gestures as referred to herein may also be contact gestures, which are gestures made by a user of a gesture source where the gesture source may be included in the receiving device and the user performs the gesture while making contact with the gesture source included in the receiving device.

A gesture source may interface with a receiving device in a multitude of ways. For example, the gesture source 102 may interface with the receiving device 104. In some implementations, the gesture source 102 may interface with a gesture receiver 106 included in the receiving device 104. The gesture receiver 106 may communicate with the gesture source 102 using one or more communication protocols. In some implementations, the gesture source 102 may communicate and/or interface with the receiving device 104 using a wireless communication protocol such as WiFi or BLUETOOTH as described herein with reference to FIG. 10. In some implementations, the gesture source 102 may communicate and/or interface with the receiving device 104 by way of one or more wired communication protocols such as Universal Serial Bus (USB) as described herein with reference to FIG. 10.

Figure 11:
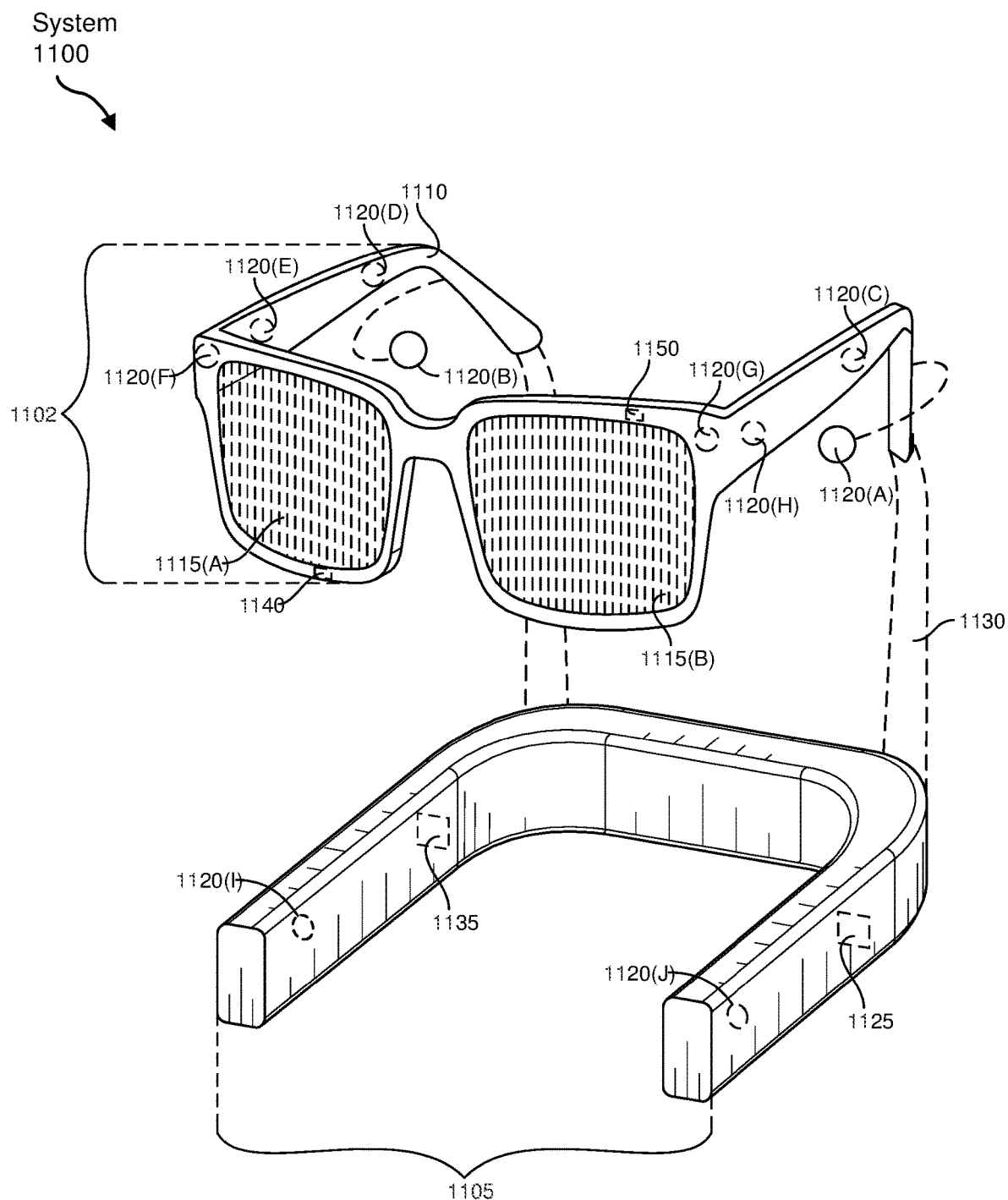
FIG. 11 is an illustration of exemplary augmented-reality glasses that may be used in connection with embodiments of this disclosure.
Figure 12:
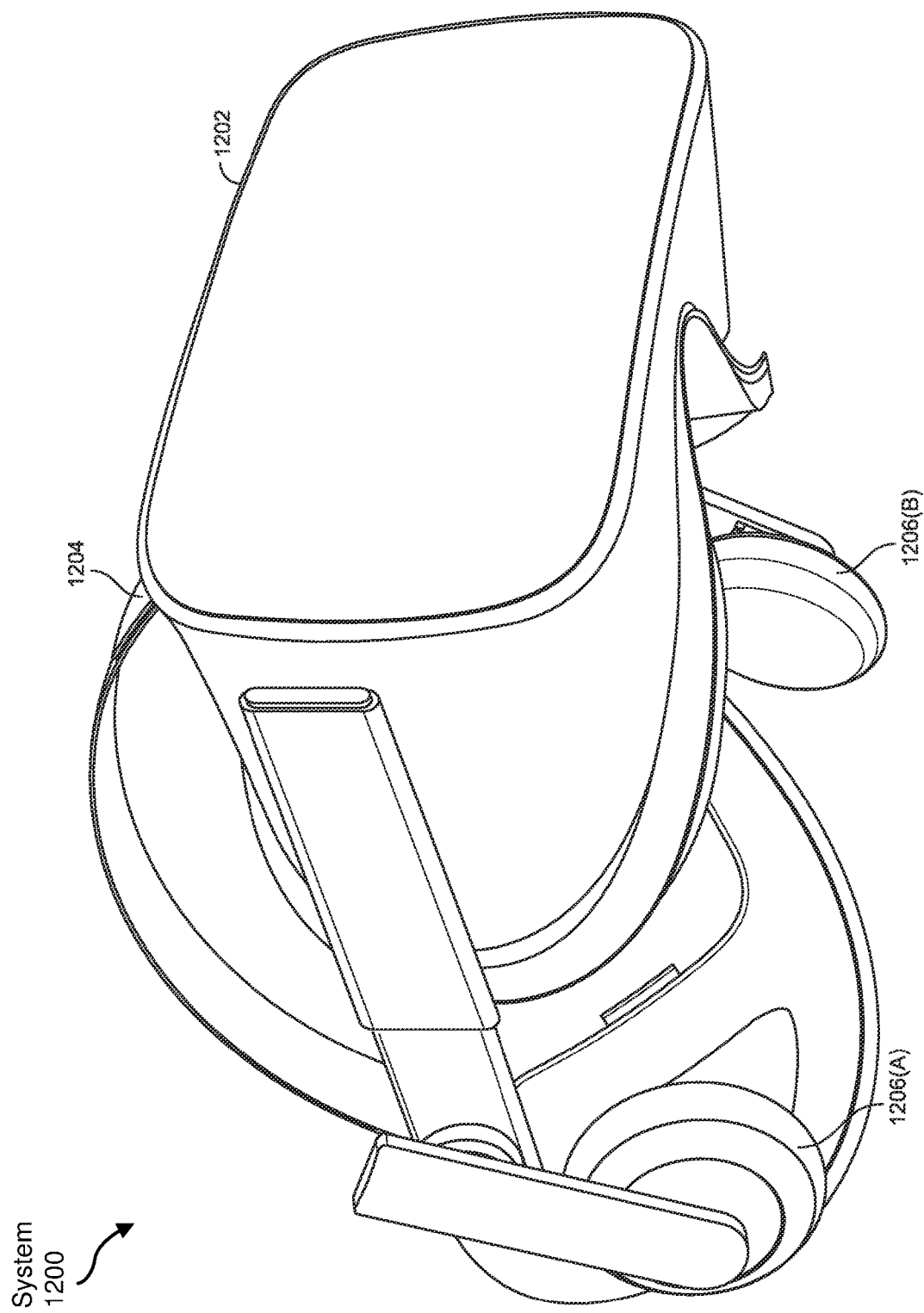
FIG. 12 is an illustration of an exemplary virtual-reality headset that may be used in connection with embodiments of this disclosure.
Figure 13:
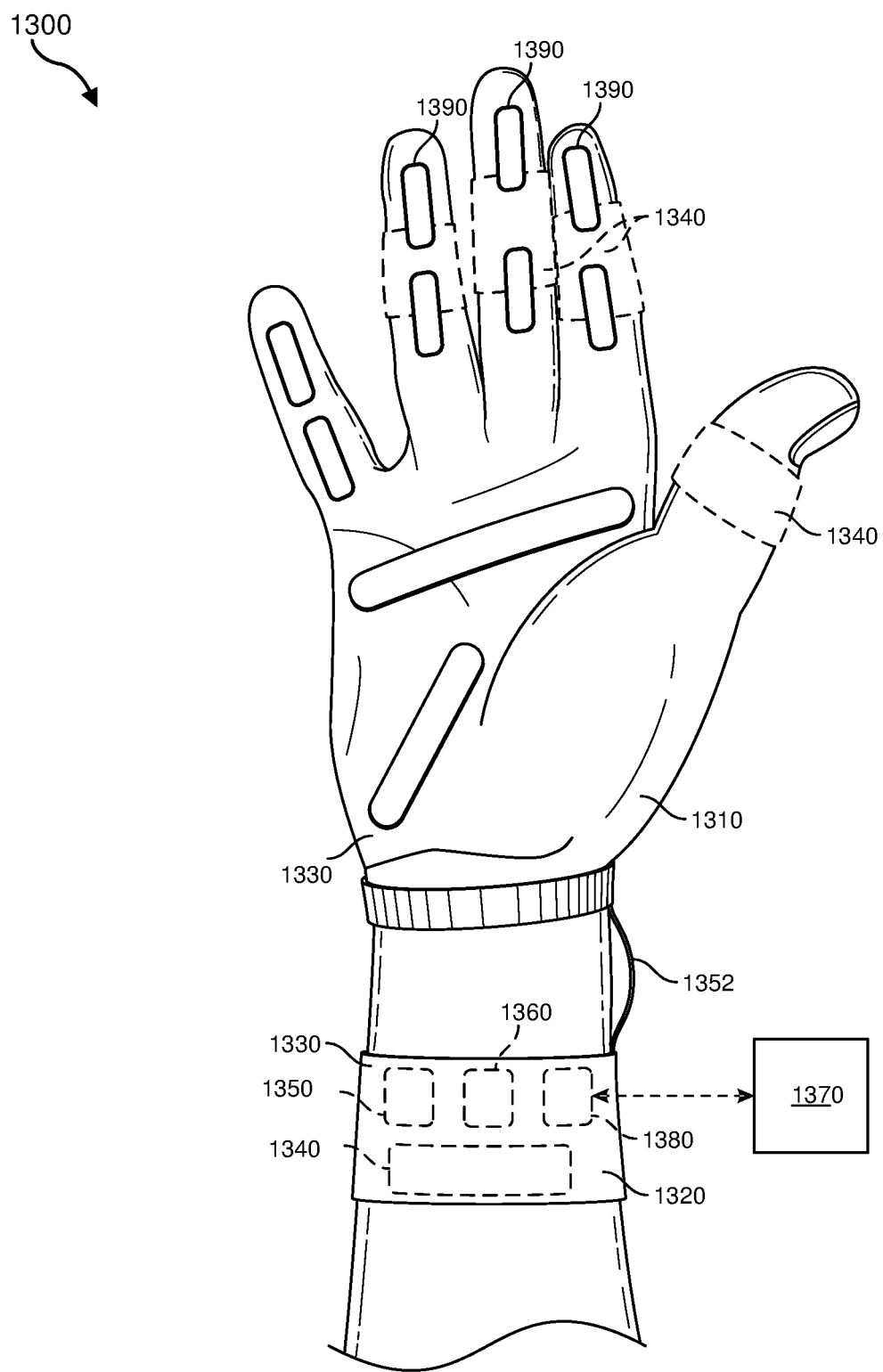
FIG. 13 is an illustration of exemplary haptic devices that may be used in connection with embodiments of this disclosure.
Figure 15:
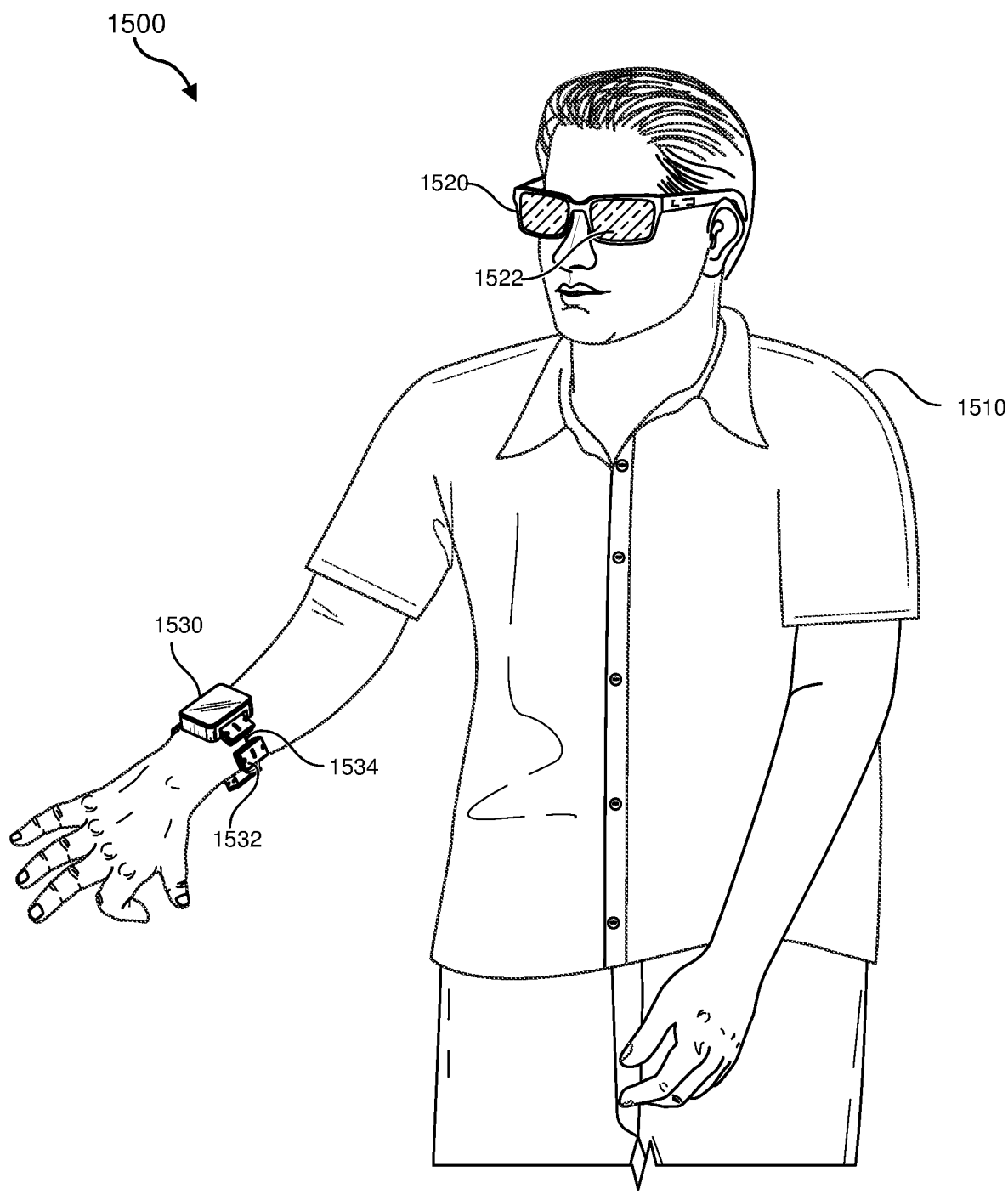
FIG. 15 is an illustration of an exemplary augmented-reality environment according to embodiments of this disclosure.

A gesture receiver may receive information and data from a gesture source as it relates to a gesture as performed by a user of the gesture source. In some implementations, the gesture source 102 and the receiving device 104 may be different computing devices. In an example implementation, the receiving device 104 may be a wearable mobile computing device (e.g., augmented-reality glasses as shown in FIG. 11, a head-worn display system such as virtual-reality system 1200 as shown in FIG. 12). The gesture source 102 may be another handheld or mobile computing device. In some implementations, the gesture source 102 may also be a wearable mobile computing device (e.g., a wearable glove (haptic device 1310) and wristband (haptic device 1320) as shown in FIG. 13, a wristband (haptic device 1530) as shown in FIG. 15, a wearable system 1600 as shown in FIGS. 16A-B and 17A-B). Such gestures may be considered motion gestures.

FIG. 2 is an illustration of an example gesture source included in an example receiving device. In some implementations, referring to FIG. 1, the gesture source 102 may be part of or included in the receiving device 104. In an example implementation, a receiving device (e.g., the receiving device 104) may be a handheld or mobile computing device (e.g., computing device 202). A gesture source (e.g., the gesture source 102) may be a touchscreen of a computing device (e.g., touchscreen 204 of the computing device 202). In this example implementation, the gesture receiver 106 may receive information and data related to user interactions with the touchscreen while running an application on the computing device. The user interactions may be gestures made by the user while contacting the touchscreen 204 of the computing device 202 (e.g., contact gestures).

A gesture receiver may include hardware and/or software for communicating with, interfacing with, and/or monitoring the gesture source to determine gestures as performed by a user when interacting with the gesture source. Referring to FIG. 1, for example, the gesture receiver 106 may receive information and data related to gestures as performed by a user interacting with the gesture source 102. The gesture receiver 106 may provide the gesture related information and data to a gesture detector 108. The gesture detector 108 may determine if the receiving device 104 should interpret the gesture related information and data as an input gesture for the system 100.

FIG. 3 is an illustration of a first example graph 300 of a frequency distribution for an input gesture (frequency distribution 302) versus a recognizer score 304. For a curve 306, the frequency distribution 302 may represent a frequency of an intention of a user to have a gesture of the user that is recognized and assigned an associated recognizer score not initiate an action on the computing device of the user because the user did not intend to perform the gesture.

FIG. 4 is an illustration of a second example graph 400 of a frequency distribution for an input gesture (the frequency distribution 302) versus the recognizer score 304. For a curve 406, the frequency distribution 302 may represent a frequency of an intention of a user to have a gesture of the user that is recognized and assigned an associated recognizer score initiate an action on the computing device of the user because the user intended to perform the gesture.

FIG. 5 is an illustration of a third example graph 500 of a frequency distribution for an input gesture (the frequency distribution 302) versus the recognizer score 304. The graph 500 combines the first graph 300 and the second graph 400. The frequency values for the gesture to not initiate an action on the computing device as shown in the curve 306 and the frequency values for the gesture to initiate an action on the computing device as shown in the curve 406 may be normalized using the same normalization factor. As such, the curve 306 and the curve 406 may be plotted using the same frequency distribution axis (the frequency distribution 302) and the same recognizer score axis (the recognizer score 304).

In some implementations, a system (e.g., the system 100 as shown in FIG. 1) may gather recognizer scores output by a gesture detector (e.g., the gesture detector 108) that represent a confidence in the accuracy of the detection or recognition of a gesture. The system may continuously record the recognizer scores while a user performs tasks on a computing device of the user. The tasks may include intentional performance of one or more gestures. In addition, or in the alternative, the tasks may include the unintentional performance of one or more gestures. In addition, or in the alternative, the tasks may include the inaccurate detection of the performance of one or more gestures.

The system may label the gathered data accordingly to indicate when a user was intentionally performing a recognized gesture, and to indicate when a user was unintentionally performing a recognized gesture. The system may create two distributions. A first distribution may include data for gesture recognition recognizer scores associated with the user intending to perform the gesture. The system may use the data for the first distribution to generate the curve 406. A second distribution may include data for gesture recognition recognizer scores associated with the user not intending to perform the gesture (e.g., the user was performing other activities). The system may use the data for the second distribution to generate the curve 306. The curve 406 and the curve 306, therefore, may represent the relative frequency of an intention of a user have a detected gesture of a particular recognizer score initiate an action on the computing device versus the relative frequency of a detected gesture of a particular recognizer score not to initiate an action on the computing device, respectively.

A system may generate a gesture response model that maps gesture recognition recognizer scores to a relative frequency of an intention of a user to have a recognized gesture initiate an action on a computing device of the user and to a relative frequency of an intention of a user to have a recognized gesture not initiate an action on a computing device of the user. For example, referring to FIGS. 1, 3, 4 and 5, a system 100 may use the curve 306 and the curve 406 to generate a gesture response model that maps recognizer scores output by the gesture detector 108 to an intention of a user to either to perform the gesture (curve 406) or not perform the gesture (curve 306). The system 100 may use the gesture response model to determine a probability of an intention of the user given a recognizer score for a gesture. For example, the system 100 may determine that for a recognizer score of 0.6 there may be a 33% chance that the user is trying to perform the gesture, and a 66% chance that the user is not trying to perform the gesture.

Referring to FIGS. 1 and 3, the gesture response identifier 110 may calculate a normalized set of frequencies versus a recognizer score for a detected gesture as shown, for example, by the curve 306. The curve 306 may represent the relative frequency of a detected gesture of a particular recognizer score not to initiate an action on the computing device. The gesture response identifier 110 may calculate a gesture recognition recognizer score that indicates a clarity of the gesture as detected by the gesture detector 108 based on a probability that the system 100, and specifically the gesture detector 108, has accurately detected the gesture. In some implementations, a context in which a user performs the gesture may impact the clarity of the information and data for the gesture as provided by the gesture source 102 to the gesture receiver 106.

Referring to FIG. 1, the system 100, and specifically the gesture response identifier 110, may identify input gesture of a particular normalized recognizer score that may fall within or under the curve 306 for gestures identified as not intended to trigger a response by the system 100. Such gestures may not trigger the receiving device 104 to respond to the gestures. As such, the gesture response identifier 110 may not provide the detected gesture to an action executer 112 for performing an action on the receiving device 104 based on the detected action.

In some cases, referring to FIG. 2, a user interacting with a touchscreen of a computing device (e.g., the touchscreen 204 of the computing device 202) may not fully complete a gesture. For example, the user may start but not complete a swipe because the user decided not to complete a particular transaction in an application running on the computing device 202. In some cases, a user interacting with a gesture source that is wirelessly interfaced to the receiving device may not fully perform or complete a gesture. For example, a handheld controller may interface wirelessly to an exemplary virtual-reality headset (e.g., virtual-reality system 1200 as shown in FIG. 12). While starting to perform a gesture using the handheld controller as the gesture source, the user may be interrupted and may then put down the controller, not completing an intended gesture for input to the virtual-reality headset.

Referring to FIGS. 1 and 4, the gesture response identifier 110 may calculate a normalized set of frequencies versus a recognizer score for a detected gesture as shown, for example, by the curve 406. The curve 406 may represent the relative frequency of a detected gesture of a particular recognizer score to initiate an action on the computing device. The gesture response identifier 110 may calculate a gesture recognition recognizer score that indicates a clarity of the gesture as detected by the gesture detector 108 based on a probability that the system 100, and specifically the gesture detector 108, has accurately detected the gesture. In some implementations, a context in which a user performs the gesture may impact the clarity of the information and data for the gesture as provided by the gesture source 102 to the gesture receiver 106.

Referring to FIG. 1, the system 100 and specifically the gesture response identifier 110 may identify input gesture of a particular normalized recognizer score that may fall within or under the curve 406 for gestures identified as intended to trigger a response by the system 100. Such gestures may trigger the receiving device 104 to respond to the gesture. As such, the gesture response identifier 110 may provide the detected gesture to an action executer 112 for performing an action on the receiving device 104 based on the detected action.

In some cases, referring to FIG. 2, a user interacting with a touchscreen of a computing device (e.g., the touchscreen 204 of the computing device 202) may fully complete a gesture. For example, the user may complete a swipe in an ecommerce application running on the computing device 202 to initiate a purchase transaction in the application. In some cases, a user interacting with a gesture source that is wirelessly interfaced to the receiving device fully perform and complete a gesture. For example, referring to FIGS. 16A-B and 17A-B, a wearable system may interface wirelessly to head-mounted display system. Examples of a head-mounted display system may include, but are not limited to, a virtual-reality headset (e.g., virtual-reality system 1200 as shown in FIG. 12) and augmented-reality glasses (e.g., augmented-reality glasses as shown in FIG. 11). The user may perform a gesture with the wearable system to initiate an action in an application running in the head-mounted display system.

Referring to FIG. 5, the third example graph 500 may represent a model of how recognizer scores output by a gesture detector map to a true intention of a user to either perform a gesture (curve 406) or not perform a gesture (curve 306). However, as shown by the graph 500, an overlapping area 502 may identify normalized frequencies for gesture information and data of gesture recognition recognizer scores that could be interpreted as gestures that are not intended to trigger a response by the system 100 or as gestures that are intended to trigger a response by the system 100.

Referring to FIGS. 1 and 5, for example, the gesture response identifier 110 may identify input gestures of recognizer scores at or below (less than) a lower threshold recognizer score 506 (e.g., at or below a recognizer score of approximately 0.57) as gestures that are not intended to trigger a response by the system 100. In another example, the gesture response identifier 110 may identify input gestures of recognizer scores at or above (greater than) an upper threshold recognizer score 508 (e.g., at or above a recognizer score of approximately 0.72) as gestures that are intended to trigger a response by the system 100. In another example, the system 100 may identify input gestures of a recognizer score of 0.6 having a 33% chance that the user is trying to perform the gesture, and a 66% chance that the user is not trying to perform the gesture.

A gesture response identifier may determine and set a gesture recognition threshold confidence level. The gesture response identifier may use the gesture recognition threshold confidence level to determine whether a gesture received and detected by a computing device was intended to trigger a response or action on the computing device. For example, referring to FIG. 1, the gesture response identifier 110 may determine and set a gesture recognition threshold confidence level 504. The gesture response identifier 110 may use the gesture recognition threshold confidence level 504 to identify input gestures of recognizer scores at or below (less than) the gesture recognition threshold confidence level 504 as gestures that are not intended to trigger a response by the system 100. The gesture response identifier 110 may use the gesture recognition threshold confidence level 504 to identify input gestures of recognizer scores at or above (greater than) the gesture recognition threshold confidence level 504 as gestures that are intended to trigger a response by the system 100.

A gesture response identifier may adjust the gesture recognition threshold confidence level based on one or more criteria. For example, the gesture response identifier 110 may adjust the gesture recognition threshold confidence level 504 based on a context in which a user performed the gesture. In some situations when interacting with the gesture source 102, a context in which the user performed the gesture may include, but is not limited to, a user being under time pressure, a user being distracted, a user being interrupted, a user changing their mind before completing the gesture, and/or a user multitasking while interacting with the gesture source (e.g., interacting with multiple applications running on the computing device of the user, walking while performing the gesture, etc.). In other situations when interacting with the gesture source 102, a context in which the user performed the gesture may include, but is not limited to, a time of day, a level of ambient lighting, a state of the computing device of the user, and/or a location where the gesture was performed.

In another example, the gesture response identifier 110 may adjust the gesture recognition threshold confidence level 504 based on a temporal cost of error correction for an action that may have been erroneous performed (or not performed) based on erroneous recognition (or ignoring of) a detected gesture. For example, the gesture response identifier 110 may adjust the gesture recognition threshold confidence level 504 based on a time to correct a false positive error (erroneously performing an unintended action). In another example, the gesture response identifier 110 may adjust the gesture recognition threshold confidence level 504 based on a time to correct a false negative error (erroneously not performing an intended action).

In some implementations, a gesture response identifier may adjust the gesture recognition threshold confidence level based on one or more criteria associated with a specific detected gesture. For example, referring to FIG. 1, the gesture response identifier 110 may dynamically adjust the gesture recognition threshold confidence level 504 for each detected gesture based on criteria associated with the detected gesture such as a context in which the user performed the gesture. Dynamically adjusting the gesture recognition threshold confidence level 504 may provide a context dependent adjusted threshold for determining if a detected gesture is intended to trigger a response by the system 100. Specifically, dynamically adjusting the gesture recognition threshold confidence level 504 for each detected gesture provides an improved system for gesture recognition for detected gestures whose normalized frequencies are of a recognizer score that may be below (less than) the upper threshold recognizer score 508 yet above (greater than) the lower threshold recognizer score 506.

FIG. 6 is an illustration of an example block diagram of a gesture response identifier (e.g., the gesture response identifier 110 as shown in FIG. 1). The gesture response identifier 110 may include an adaptive modulator 602 that receives criteria for use in adjusting a confidence level for use by a gesture recognizer 604. The gesture recognizer 604 may use an adapted modulated gesture recognition threshold level (e.g., the gesture recognition threshold confidence level 504) to determine whether to trigger a response to a detected gesture. When the gesture recognizer 604 determines that the response may be triggered, the triggering of the response by the gesture recognizer 604 may cause the action executer 112 to perform an action based on the detected gesture.

An estimator included in an adaptive modulator may use criteria for a context in which a user performs a detected gesture to provide a gesture response model with an estimation of an influence or impact of the context on a recognizer score for the detected gesture. For example, referring to FIG. 1, an estimator 606 may receive criteria 608a-f associated with a context of a user when interacting with the gesture source 102.

Criterion 608a may be a time to correct a false negative error. For example, the criterion 608a may be a time-based value (e.g., seconds, minutes, hours, etc.) for how long it may take to perform a task that the system 100 erroneously did not perform because of erroneously detecting an intended gesture as unintended.

Criterion 608b may be a time to correct a false positive error. For example, the criterion 608b may be a time-based value (e.g., seconds, minutes, hours, etc.) for how long it may take to undo a task that the system 100 erroneously performed because of erroneously detecting an unintended gesture as intended.

Criterion 608c may be a probability of providing an input to the system versus not providing the input. For example, criterion 608c may be a value (e.g., a percentage value, a normalized value) for a probability of an impact to the system 100 of performing versus not performing an action in the system 100 that is associated with the input.

Criterion 608d may be one or more parameters associated with a current task of a user while interacting with a gesture source. For example, the one or more parameters may include, but are not limited to, a time of day, a level of ambient lighting, a state of a computing device of the user that may include the gesture source, and/or a location where the user performed the gesture.

Criterion 608e may be a degree of multitasking of a user while interacting or not interacting with a gesture source. In some cases, the degree of multitasking may be based, at least in part, on a number of applications that are active (e.g., running or executing) on the computing device of the user that may include the gesture source. In some cases, the degree of multitasking may be based, at least in part, on other activities the user may be performing while interacting with the gesture source, such as walking or talking, that may cause the user to be distracted possibly leading to erroneous input gestures. In some cases, the degree of multitasking may be based, at least in part, on other activities the user may be performing while not interacting with the gesture source that may be interpreted as input by the gesture source, such as finger pinching actions that a user may perform while folding laundry, turning pages of a book, etc. that may be interpreted as input by a wrist-worn computing device of a user.

Criterion 608f may be a degree of time pressure a user may face when interacting with a gesture source. For example, the degree of time pressure may be based on a number of actively running applications on a computing device of the user that may include the gesture source, and/or a current activity of the user while inputting the gesture (e.g., the user needs to provide the input quickly, the user is distracted by other activities being performed by other applications running on the computing device that includes the gesture source).

An estimator may generate an estimate of a combination of one or more of the criteria for a context in which a user performs a detected gesture. In some implementations, the estimator may use all of the criteria for generating the estimate. In some implementations, the estimator may use a subset of the criteria (e.g., less than all of the criteria) for generating the estimate. In some implementations, the estimator may provide a weight to one or more of the criteria when generating the estimate. For example, each weight may be based on an importance of the respective criterion in the context.

An estimator may provide an estimate of a combination of one or more of the criteria for a context in which a user performs a detected gesture to a gesture response model. The gesture response model may use the estimate for determining or calculating an adapted modulated gesture recognition threshold for the detected gesture. For example, the estimator 606 may provide an estimate of a combination of one or more of the criteria 608a-f to a gesture response model 610. The gesture response model 610 may also receive a recognizer score 612. The recognizer score 612 may be a score for recognizing a detected gesture independent of a context in which a user performed the detected gesture. For example, the recognizer score 612 may be based on machine learning of a confidence associated with a measure of the detected gesture.

The gesture response model 610 may use the estimate of the combination of the one or more of the criteria 608a-f provided by the estimator 606 to further refine, adapt, or update the recognizer score 612 to generate an adapted modulated gesture recognition threshold (e.g., the gesture recognition threshold confidence level 504) for use by the gesture recognizer 604 when determining if a detected gesture provided by the gesture detector 108 is intended or unintended. In some implementations, the gesture response model 610 may apply a weight or importance to the combination of the one or more of the criteria 608a-f provided by the estimator 606 and/or to the recognizer score 612 when generating the gesture recognition threshold confidence level 504.

Referring to FIGS. 3-5, the gesture recognizer 604 may use the gesture recognition threshold confidence level 504 to determine if a recognized gesture is intended or unintended. If the gesture recognizer 604 recognizes the gesture as intended, the gesture recognizer 604 may trigger the response to the gesture causing the action executer 112 to perform an action based on the intended detected gesture. If the gesture recognizer 604 recognizes the gesture as unintended, the gesture recognizer 604 may not trigger the response to the gesture.

FIG. 7 is a flow diagram of an exemplary computer-implemented method 700 for recognizing and responding to an intended gesture. The steps shown in FIG. 7 may be performed by any suitable computer-executable code and/or computing system, including the system(s) illustrated in FIGS. 1, 6, 9 and 10. In one example, each of the steps shown in FIG. 7 may represent an algorithm whose structure includes and/or is represented by multiple sub-steps, examples of which will be provided in greater detail below.

As illustrated in FIG. 7, at step 710 one or more of the systems described herein may generate gesture data. For example, referring to FIG. 1, the gesture source 102 may generate gesture data.

In some embodiments, the term "gesture" may refer to movement performed by a user (e.g., by a part of a body of a user, a hand, a head, etc.) for use as intended input to a computing device for controlling the operation of the computing device. In some cases, a user may perform the gesture while contacting the computing device (e.g., swiping a finger of the user across the screen of the computing device). Such gestures may be referred to as contact gestures. In other cases, the user may perform the gesture without necessarily making any physical contact with the computing device (e.g., the computing device may be a wearable mobile computing device and the gesture source may be another handheld or mobile computing device). Such gestures may be referred to as motion gestures. As discussed herein, the term "gesture" may refer to contact gestures and motion gestures.

The systems described herein may perform step 710 in a variety of ways. In one example, referring to FIG. 1, the gesture source may generate gesture information and data based on a user interacting with the gesture source 102.

As illustrated in FIG. 7, at step 712 one or more of the systems described herein may receive gesture data. For example, referring to FIG. 1, the gesture receiver may receive gesture data from the gesture source 102.

The systems described herein may perform step 712 in a variety of ways. In one example, the receiving device 104, and specifically the gesture receiver 106, may receive information and data representative of an interaction of a user with the gesture source 102 from the gesture source 102. In some implementations, the gesture source 102 and the receiving device may be different computing devices. For example, the gesture source 102 may provide information and data representative of an interaction of a user with the gesture source 102 to the receiving device 104 by way of a network (e.g., a wireless network).

As illustrated in FIG. 7, at step 714 one or more of the systems described herein may determine if a gesture that appears to be intended to trigger a response is detected (if a potential gesture is detected). For example, referring to FIG. 1, the gesture receiver 106 may provide gesture related information and data to the gesture detector 108. The gesture detector 108 may determine if the receiving device 104 should interpret the gesture related information and data as a potential input gesture for the system 100.

The systems described herein may perform step 714 in a variety of ways. In one example, the gesture detector 108 may determine that the gesture related information and data received by the gesture receiver 106 is for a gesture that appears to be intended to trigger a response by the receiving device 104. If the gesture detector 108 determines that the gesture related information and data received by the gesture receiver 106 is for a gesture that appears to be intended to trigger a response by the receiving device 104 (a potential intended gesture), the method continues to step 718. If the gesture detector 108 determines that the gesture related information and data received by the gesture receiver 106 is an unintended gesture, the method continues to step 712.

As illustrated in FIG. 7, at step 718 one or more of the systems described herein may identify one or more parameters associated with a current task of a user while interacting with a gesture source. For example, the one or more parameters may include, but are not limited to, a time of day, a level of ambient lighting, a state of a computing device of the user that may include the gesture source, and/or a location where the user performed the gesture. For example, referring to FIG. 1, in implementations where the gesture source 102 is part of (included in) the receiving device 104, the receiving device 104 may identify the one or more parameters using hardware and/or software on the receiving device 104. For example, referring to FIG. 1, in implementations where the gesture source 102 is not part of (is separate from) the receiving device 104, the gesture source 102 may identify the one or more parameters using hardware and/or software on the gesture source 102. The gesture source 102 may provide the one or more parameters to the receiving device 104.

The systems described herein may perform step 718 in a variety of ways. In one example, a clock application may provide time of day data. In another example, a Global Positioning System (GPS) may provide location information and data. In some implementations where the receiving device 104 includes the gesture source 102, the receiving device 104 may also include the clock application, the GPS, and any other hardware and/or software for use in identifying the one or more parameters associated with a current task of the user while interacting with the gesture source 102. In some implementations where the receiving device 104 does not include the gesture source 102, the gesture source 102 may include the clock application, the GPS, and any other hardware and/or software for use in identifying the one or more parameters associated with a current task of the user while interacting with the gesture source 102.

As illustrated in FIG. 7, at step 720 one or more of the systems described herein may identify a degree of multitasking of a user while interacting with a gesture source. For example, referring to FIG. 1, the system 100 may identify a degree of multitasking of a user while interacting with the gesture source 102.

In some embodiments, the term "multitasking" may refer to a user performing more than one task while interacting with a gesture source. For example, a user may be interfacing with a touchscreen of a computing device while walking. In this example, the multitasking of the user, and specifically a degree of the multitasking, may contribute to erroneous gesture detection (e.g., false negatives and/or false positives).

In some embodiments, the term "multitasking" may refer to a computing device executing more than one (e.g., two or more) applications on the computing device simultaneously. In this example, the multitasking of the computing device that includes the gesture source, and specifically a degree of the multitasking, may contribute to erroneous gesture detection (e.g., false negatives and/or false positives).

In some embodiments, the term "multitasking" may refer to a user performing multiple activities that may or may not involve a computing device of a user. For example, the system 100 may detect an input gesture that was not intended to initiate an action on the system 100. For example, a user may be wearing a computing device on a wrist of the user. The wrist-worn computing device may detect a pinch gesture. However, the user may be performing the pinch gesture while engaged in an activity independent of the wrist-worn device. Because the fingers of the user while engaged in this activity may be performing a pinch gesture similar to the pinch gesture for use as input to the wrist-worn computing device, the system 100 may misinterpret the pinch gesture as intending to initiate an action on the wrist-worn computing device. This would in the occurrence of a false positive error.

The systems described herein may perform step 720 in a variety of ways. In one example, a computing device that includes the gesture source 102 may determine multitasking of the user and/or the computing device for use by the system 100 in determining a degree of multitasking of the user while performing the gesture.

As illustrated in FIG. 7, at step 722 one or more of the systems described herein may identify a degree of time pressure that the user may be under while performing the input gesture. For example, referring to FIG. 1, the system 100 may identify a degree of time pressure that the user may be under while interacting with the gesture source 102.

The systems described herein may perform step 722 in a variety of ways. In one example, a computing device that includes the gesture source 102 may determine a number of actively running applications on the computing device while the user is interacting with the gesture source that may contribute to or be a basis for the time pressure. In another example, a computing device that includes the gesture source 102 may determine a current activity of the user while interacting with the gesture source that may place a time constraint on the interaction.

As illustrated in FIG. 7, at step 724 one or more of the systems described herein may determine a time (e.g., estimate a time) to correct a false negative error. For example, referring to FIG. 1, the gesture response identifier 110 may determine (e.g., calculate an estimation of) a time to correct a false negative error.

In some embodiments, the term "false negative" may refer to incorrectly determining that a gesture is unintended. Because of this determination, a gesture that was intended to trigger a response, did not trigger the response and subsequently an action was not performed on a computing device.

The systems described herein may perform step 724 in a variety of ways. In one example, the gesture response identifier 110 may determine an estimated time involved in recovering from not performing an action on the receiving device 104 as a time to correct a false negative error. In some implementations, a context in which the user performed the gesture using the gesture source 102 may include an estimated time involved in recovering from not performing the action.

As illustrated in FIG. 7, at step 726 one or more of the systems described herein may determine a time (e.g., estimate a time) to correct a false positive error. For example, referring to FIG. 1, the gesture response identifier 110 may determine (e.g., calculate an estimation of) a time to correct a false positive error.

In some embodiments, the term "false positive" may refer to incorrectly determining that a gesture is intended. Because of this determination, a gesture triggered a response and subsequently an action was performed on a computing device that should not have been performed.

The systems described herein may perform step 726 in a variety of ways. In one example, the gesture response identifier 110 may determine an estimated time involved in recovering from performing an action on the receiving device 104 that should not have been performed as a time to correct a false positive error. The estimated recovery time may include the time needed to undo the action on the receiving device 104. In some implementations, a context in which the user performed the gesture using the gesture source 102 may include an estimated time involved in recovering from performing the action.

As illustrated in FIG. 7, at step 728 one or more of the systems described herein may determine a probability of a gesture as an input to a computing device. For example, referring to FIG. 1, the system 100 may determine a probability of a gesture as an input to the receiving device 104.

In some embodiments, the term "probability" may refer to a likelihood of an occurrence of an event. For example, a probability of a gesture being an input may be a likelihood of a detected gesture being a particular input to a computing device.

The systems described herein may perform step 728 in a variety of ways. In one example, the gesture response identifier 110 may determine a probability that a detected gesture is an input to the computing device.

As illustrated in FIG. 7, at step 730 one or more of the systems described herein may determine a probability of a gesture as not being an input to a computing device. For example, referring to FIG. 1, the system 100 may determine a probability of a gesture as not being an input to the receiving device 104. For example, a probability of a gesture not being an input may be a likelihood of a detected gesture not being a particular input to a computing device.

The systems described herein may perform step 730 in a variety of ways. In one example, the gesture response identifier 110 may determine a probability that a detected gesture is not an input to the computing device.

As illustrated in FIG. 7, at step 732 one or more of the systems described herein may generate an estimate based on a context associated with the gesture. For example, referring to FIG. 6, the estimator 606 may generate an estimate based on a combination of one or more of the criteria for a context in which a user performs a detected gesture. The one or more criteria are determined in steps 718, 720, 722, 724, 726, 728, and 730. In some implementations, the estimator 606 may generate an estimate based on a single criteria. In some implementations, the estimator 606 may generate an estimate based on a combination of one or more criteria that may be two or more criteria but less than all criteria. In some implementations, the estimator 606 may generate an estimate based on all criteria.

In some embodiments, the term "context" may refer to one or more of a combination of circumstances, situations, and/or environments that form a setting for the understanding, interpreting, and/or recognition of a gesture.

The systems described herein may perform step 732 in a variety of ways. In one example, the estimator 606 may generate an estimate of a combination of one or more of the criteria as determined in steps 718, 720, 722, 724, 726, 728, and 730 for a context in which a user performed a detected gesture. In some implementations, the estimator 606 may use all of the criteria as determined in steps 718, 720, 722, 724, 726, 728, and 730 for generating the estimate. In some implementations, the estimator 606 may use a subset of the criteria (e.g., less than all of the criteria) for generating the estimate. In some implementations, the estimator 606 may provide a weight to one or more of the criteria when generating the estimate. For example, each weight may be based on an importance of the respective criterion in the context.

As illustrated in FIG. 7, at step 734 one or more of the systems described herein may determine a recognizer score for the gesture. For example, referring to FIG. 1, the system 100, and specifically the gesture response identifier 110, may determine a recognizer score for the gesture.

In some embodiments, the term "recognizer score" may refer to a number or value that expresses a confidence in a detected gesture as being recognized or intended. The gesture recognizer 604 may use the gesture recognition threshold confidence level 504 to determine if a recognized gesture is intended or unintended. As shown for example in FIG. 5, the gesture recognition threshold confidence level 504 may be based on the recognizer score 304 for a detected gesture.

The systems described herein may perform step 734 in a variety of ways. In one example, the recognizer score 612 may be a score for recognizing a detected gesture that may be based on machine learning of a confidence associated with a measure of the detected gesture.

As illustrated in FIG. 7, at step 736 one or more of the systems described herein may determine a gesture recognition threshold confidence level. For example, referring to FIG. 6, the gesture response model 610 may generate the gesture recognition threshold confidence level 504.

As illustrated in FIG. 7, at step 736 one or more of the systems described herein may use an estimate for determining or generating the gesture recognition threshold confidence level 504 for the detected gesture. For example, the estimator 606 may provide an estimate of a combination of one or more of the criteria 608a-f to the gesture response model 610. The gesture response model 610 may also receive the recognizer score 612. The gesture response model 610 may use the estimate of the combination of the one or more of the criteria 608a-f provided by the estimator 606 to further refine, adapt, or update the recognizer score 612 to generate the gesture recognition threshold confidence level 504.

As illustrated in FIG. 7, at step 738 one or more of the systems described herein may determine whether the system should response to the gesture. For example, referring to FIG. 6, the gesture recognizer 604 may determine whether to respond to a detected gesture.

The systems described herein may perform step 738 in a variety of ways. In one example, the gesture recognizer 604 may use the gesture recognition threshold confidence level 504 when determining if a detected gesture provided by the gesture detector 108 is intended or unintended. If the gesture recognizer 604 determines that the gesture is an unintended gesture, the method continues to step 712. If the gesture recognizer 604 determines that the gesture is an intended gesture, the method continues to step 740.

As illustrated in FIG. 7, at step 740 one or more of the systems described herein may perform one or more actions based on the gesture. For example, referring to FIG. 6, the gesture recognizer may determine whether to respond to a detected gesture.

In some embodiments, the term "action" may refer to performing a process or activity on a computing device in response to and based on an intended gesture of a user. For example, an action may be executing an application on the computing device.

The systems described herein may perform step 740 in a variety of ways. In one example, when the gesture recognizer 604 determines that the response may be triggered, the triggering of the response by the gesture recognizer 604 may cause the action executer 112 to perform an action based on the detected gesture.

FIG. 8 is a flow diagram of an exemplary computer-implemented method 800 for adaptive input thresholding based on the temporal costs of error correction and/or user tasks. The steps shown in FIG. 8 may be performed by any suitable computer-executable code and/or computing system, including the system(s) illustrated in FIGS. 1, 6, 9, and 10. In one example, each of the steps shown in FIG. 8 may represent an algorithm whose structure includes and/or is represented by multiple sub-steps, examples of which will be provided in greater detail below.

As illustrated in FIG. 8, at step 810 one or more of the systems described herein may detect a gesture that appears to be intended to trigger a response by the computing system. For example, referring to FIG. 1, the system 100 may detect a gesture that appears to be intended to trigger a response by the system 100.

In some embodiments, the term "trigger" may refer to something that may cause or initiate a particular response in a system. The response may then be used to initiate the performance of an action by the system.

The systems described herein may perform step 810 in a variety of ways. In one example, the gesture receiver 106 may detect a gesture that appears to be intended to trigger a response by the receiving device 104 based on information and data received from the gesture source 102.

As illustrated in FIG. 8, at step 820 one or more of the systems described herein may identify a context in which the gesture was performed. For example, referring to FIGS. 1 and 6, an estimator 606 may receive criteria 608a-f associated with a context of a user when interacting with the gesture source 102.

The systems described herein may perform step 820 in a variety of ways. In one example, referring to FIGS. 1, 6, and 7, the gesture source 102 and/or the receiving device 104 may identify a context in which the gesture was performed as described, for example, with reference to steps 718, 720, 722, 724, 726, 728, and 730.

As illustrated in FIG. 8, at step 830 one or more of the systems described herein may adjust, based at least on the context in which the gesture was performed, a threshold for determining whether to trigger the response to the gesture in a manner that may cause the computing system to perform an action that is based on the detected gesture. For example, referring to FIG. 1, the gesture response identifier 110 may adjust a threshold for determining whether to trigger the response to the gesture. The adjustment to the threshold may be based at least in part on the context in which the gesture was performed. The triggering of the response by the gesture response identifier 110 may cause the action executer 112 to perform an action on the receiving device 104 based on the detected gesture.

The systems described herein may perform step 830 in a variety of ways. In one example, the estimator 606 may provide an estimate of a combination of one or more of the criteria 608a-f to the gesture response model 610. The gesture response model 610 may receive the recognizer score 612, and an estimate of a combination of one or more of the criteria 608a-f from the estimator 606. The gesture response model 610 may use the estimate of the combination of the one or more of the criteria 608a-f provided by the estimator 606 to further refine, adapt, or update the recognizer score 612 to generate the gesture recognition threshold confidence level 504, which may be the adjusted threshold for responding to the gesture. The gesture recognizer 604 may use the gesture recognition threshold confidence level 504 to determining whether to trigger a response to the gesture. The trigger of the response by the gesture recognizer 604 may cause the action executer 112 to perform an action on the receiving device 104 based on the detected gesture.

EXAMPLE EMBODIMENTS

Example 1: A computer-implemented method may include detecting, by a computing system, a gesture that appears to be intended to trigger a response by the computing system, identifying, by the computing system, a context in which the gesture was performed, and adjusting, based at least on the context in which the gesture was performed, a threshold for determining whether to trigger the response to the gesture in a manner that causes the computing system to perform an action that is based on the detected gesture.

Example 2: The computer-implemented method of Example 1, where the context in which the gesture was performed may include an estimated time involved in recovering from performing the action, and adjusting the threshold for determining whether to trigger the response to the gesture may be based on the estimated time involved in recovering from performing the action if the gesture was not intended to trigger the response and the action was performed.

Example 3: The computer-implemented method of Example 1, where the context in which the gesture was performed may include an estimated time involved in recovering from not performing the action, and adjusting a threshold for determining whether to trigger the response to the gesture may be based on an estimated time involved in recovering from not performing the action if the gesture was intended to trigger the response and the action was not performed.

Example 4: The computer-implemented method of any of Examples 1-3, further including calculating a recognizer score that indicates a clarity of the gesture via a probability that the computing system has accurately interpreted the gesture, where the context in which the gesture was performed may include the clarity of the gesture, and adjusting the threshold for determining whether to trigger the response to the gesture may be based on the probability that the gesture is intended to trigger the response.

Example 5: The computer-implemented method of any of Examples 1-4, further comprising determining whether the user who performed the gesture is involved in multitasking on the computing system, where the context in which the gesture was performed may include a degree of the multitasking occurring when the gesture is detected, and adjusting the threshold for determining whether to trigger the response to the gesture may be based on the degree of the multitasking occurring when the gesture is detected by the computing system.

Example 6: The computer-implemented method of Example-5, where the degree of multitasking may be based on at least one of a number of applications running on the computing system or a number of activities being performed by a user of the computing system.

Example 7: The computer-implemented method of any of Examples 1-6, where the context in which the gesture was performed may include an amount of time involved in detecting the gesture, and adjusting the threshold for determining whether to trigger the response to the gesture may be based on the amount of time involved in detecting the gesture.

Example 8: The computer-implemented method of Example 7, where the amount of time involved in detecting the gesture may be based on at least one of an application running on the computing system, an activity being performed by a user of the computing system, or a speed of a behavior of a user of the computing system.

Example 9: The computer-implemented method of any of Examples 1-8, where detecting the gesture may include detecting one of a sequence of gestures intended to trigger the response by the computing system, and performing the action based on the detected gesture may include performing the action based on the sequence of gestures.

Example 10: The computer-implemented method of any of Examples 1-9, where the context in which the gesture was performed may include one or more of a time-of-day, a level of ambient lighting, a state of the computing system, or a location where the gesture was performed.

Example 11: A system may include at least one physical processor, and physical memory including computer-executable instructions that, when executed by the physical processor, cause the physical processor to detect, by a computing device, a gesture that appears to be intended to trigger a response by the system, identify, by the computing device, a context in which the gesture was performed, and adjust, based at least on the context in which the gesture was performed, a threshold for determining whether to trigger the response to the gesture in a manner that causes the system to perform an action that is based on the detected gesture.

Example 12: The system of Example 11, where the context in which the gesture was performed may include an estimated time involved in recovering from performing the action, and adjusting the threshold for determining whether to trigger the response to the gesture may be based on the estimated time involved in recovering from performing the action if the gesture was not intended to trigger the response and the action was performed.

Example 13: The system of Example 11, where the context in which the gesture was performed may include an estimated time involved in recovering from not performing the action, and adjusting a threshold for determining whether to trigger the response to the gesture may be based on an estimated time involved in recovering from not performing the action if the gesture was intended to trigger the response and the action was not performed.

Example 14: The system of any of Examples 11-13, further including computer-executable instructions that, when executed by the physical processor, cause the physical processor to calculate a recognizer score that indicates a clarity of the gesture via a probability that the system has accurately interpreted the gesture, where the context in which the gesture was performed may include the clarity of the gesture, and adjusting the threshold for determining whether to trigger the response to the gesture may be based on the probability that the gesture is intended to trigger the response.

Example 15: The system of any of Examples 11-14, further including computer-executable instructions that, when executed by the physical processor, cause the physical processor to determine whether the user who performed the gesture is involved in multitasking on the system, where the context in which the gesture was performed may include a degree of the multitasking occurring when the gesture is detected, and adjusting the threshold for determining whether to trigger the response to the gesture may be based on the degree of the multitasking occurring when the gesture is detected by the system.

Example 16: The system of Example 15, where the degree of multitasking may be based on at least one of a number of applications running on the system or a number of activities being performed by a user of the system.

Example 17: The system of any of Examples 11-16, where the context in which the gesture was performed may include an amount of time involved in detecting the gesture, and adjusting the threshold for determining whether to trigger the response to the gesture may be based on the amount of time involved in detecting the gesture.

Example 18: The system of Example 17, where the amount of time involved in detecting the gesture may be based on at least one of an application running on the system, an activity being performed by a user of the system, or a speed of a behavior of a user of the system.

Example 19: The system of any of Examples 11-18, where detecting the gesture may include detecting one of a sequence of gestures intended to trigger the response by the system, and performing the action based on the detected gesture comprises performing the action based on the sequence of gestures.

Example 20: A non-transitory computer-readable medium including one or more computer-executable instructions that, when executed by at least one processor of a computing device of a computing system, may cause the computing device to detect a gesture that appears to be intended to trigger a response by the computing system, identify, by the computing device, a context in which the gesture was performed, and adjust, based at least on the context in which the gesture was performed, a threshold for determining whether to trigger the response to the gesture in a manner that causes the computing system to perform an action that is based on the detected gesture.

Figure 9:
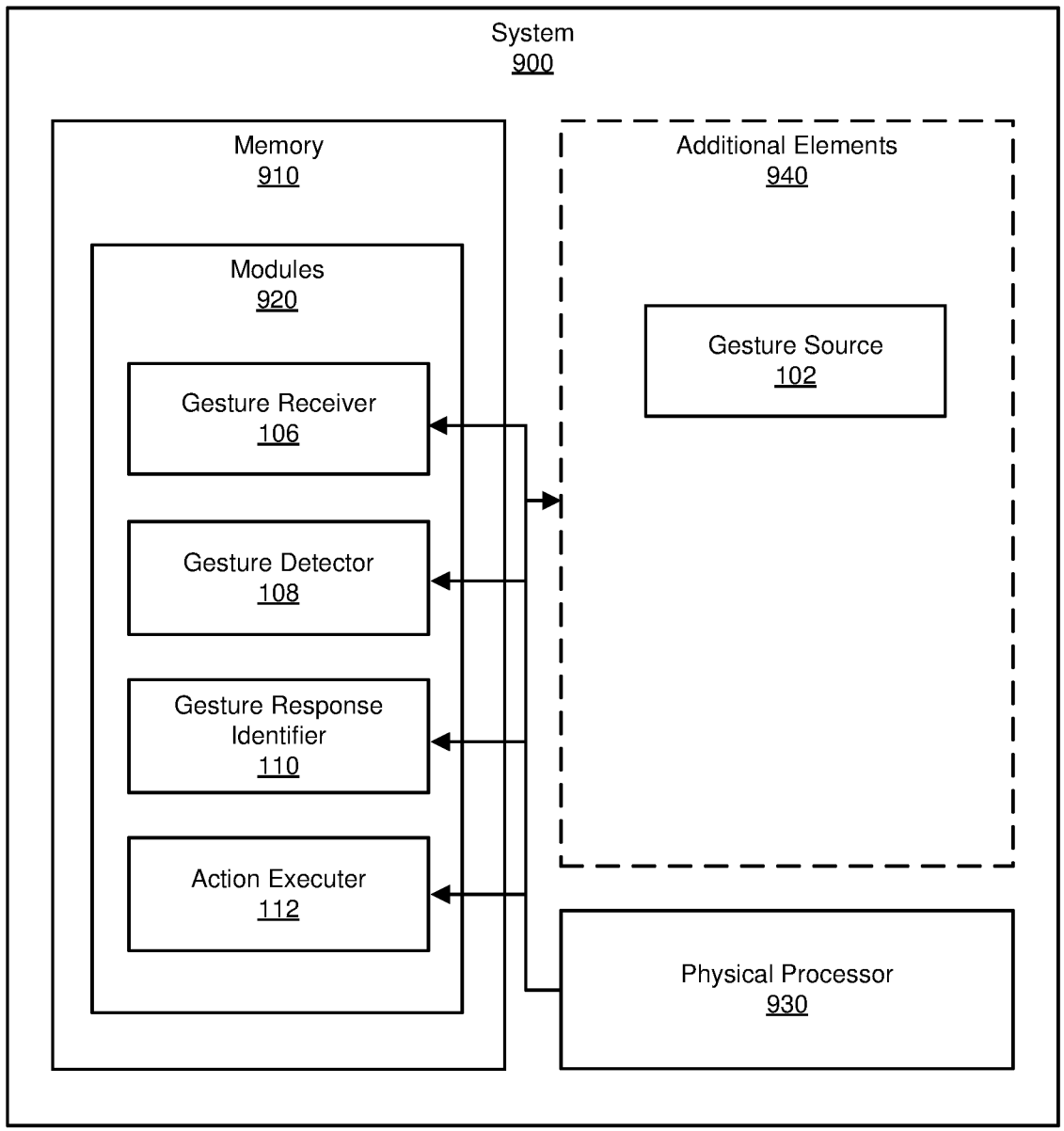
FIG. 9 is a block diagram of an example system that includes modules for use in adaptive input thresholding based on the temporal costs of error correction and/or user tasks.

FIG. 9 is a block diagram of an example system 900 that includes modules for use in adaptive input thresholding based on the temporal costs of error correction and/or user tasks. Modules 920 may include the gesture receiver 106, the gesture detector 108, the gesture response identifier 110, and the action executer 112. Although illustrated as separate elements, one or more of modules 920 in FIG. 9 may represent portions of a single module or application.

In certain embodiments, one or more of modules 920 in FIG. 9 may represent one or more software applications or programs that, when executed by a computing device, may cause the computing device to perform one or more tasks. As illustrated in FIG. 9, example system 900 may also include one or more memory devices, such as memory 910. Memory 910 generally represents any type or form of volatile or non-volatile storage device or medium capable of storing data and/or computer-readable instructions. In one example, memory 910 may store, load, and/or maintain one or more of modules DD20. Examples of memory 910 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 9, example system 900 may also include one or more physical processors, such as physical processor 930. Physical processor 930 generally represents any type or form of hardware-implemented processing unit capable of interpreting and/or executing computer-readable instructions. In one example, physical processor 930 may access and/or modify one or more of modules 920 stored in memory 910. Additionally, or alternatively, physical processor 930 may execute one or more of modules 920. Examples of physical processor DD30 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 9, example system 900 may also include one or more additional elements 940. The additional elements 940 generally represent any type or form of hardware and/or software. In one example, physical processor 930 may access and/or modify one or more of the additional elements 940.

One or more repositories may include the additional elements 940. The one or more repositories may be memory (e.g., the memory 910). The one or more repositories may be databases. In some implementations, the additional elements 940 may be included (part of) the system 900. In some implementations, the additional elements 940 may be external to the system 900 and accessible by the system 900. The additional elements 940 may include the gesture source 102.

Figure 10:
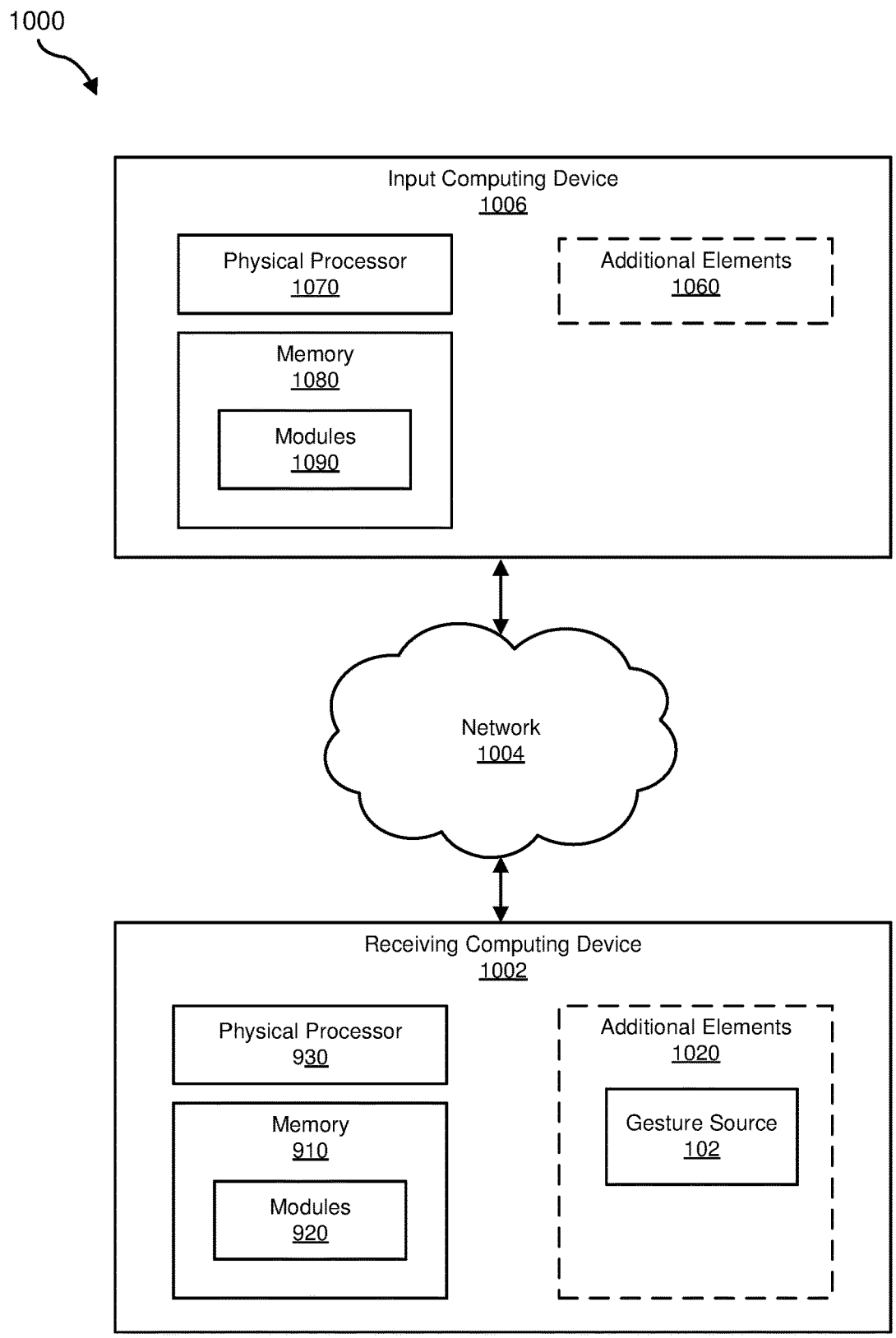
FIG. 10 illustrates an exemplary network environment in which aspects of the present disclosure may be implemented.

FIG. 10 illustrates an exemplary network environment 1000 in which aspects of the present disclosure may be implemented. The network environment 1000 may include one or more computing devices (e.g., receiving computing device 1002 and input computing device 1006) and a network 1004. In one example, referring to FIG. 1, the input computing device 1006 may be a gesture source (e.g., the gesture source 102) and the receiving computing device 1002 may be a computing device that received gesture information and data from a gesture source (e.g., the receiving device 104).

In this example, the input computing device 1006 may include a physical processor 1070 that may be one or more general-purpose processors that execute software instructions. The input computing device 1006 may include a data storage subsystem that includes a memory 1080 which may store software instructions, along with data (e.g., input and/or output data) processed by execution of those instructions. The memory 1080 may include modules 1090 that may be used to control the operation of the input computing device 1006. The input computing device 1006 may include additional elements 1060. In some implementations, all or part of the additional elements 1060 may be external to the input computing device 1006 and the receiving computing device 1002 and may be accessible by the input computing device 1006 either directly (a direct connection) or by way of the network 1004.

The receiving computing device 1002 may represent a client device or a user device, such a desktop computer, laptop computer, tablet device, smartphone, or other computing device. In some implementations, the receiving computing device 1002 may be part of or included in augmented reality glasses, virtual reality headsets, virtual-reality environments, and/or augmented-reality environments, examples of which are described herein with reference to FIGS. 11-15.

Referring to FIG. 9, the receiving computing device 1002 may include a physical processor (e.g., physical processor 930), which may represent a single processor or multiple processors, and one or more memory devices (e.g., memory 910), which may store instructions (e.g., software applications) and/or data in one or more modules 920. The modules 920 may store software instructions, along with data (e.g., input and/or output data) processed by execution of those instructions. The receiving computing device 1002 may include additional elements 1020. Referring to FIG. 9, the additional elements 1020 may include all or part of the additional elements 940.

The receiving computing device 1002 may be communicatively coupled to the input computing device 1006 through the network 1004. The network 1004 may be any communication network, such as the Internet, a Wide Area Network (WAN), or a Local Area Network (LAN), and may include various types of communication protocols and physical connections. The input computing device 1006 may communicatively connect to and/or interface with various devices through the network 1004. In some embodiments, the network 1004 may support communication protocols such as transmission control protocol/Internet protocol (TCP/IP), Internet packet exchange (IPX), systems network architecture (SNA), and/or any other suitable network protocols. In some embodiments, data may be transmitted by the network 1004 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee).

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

In some examples, augmented-reality system 1100 may also include a microphone array with a plurality of acoustic transducers 1120(A)-1120(J), referred to collectively as acoustic transducers 1120. Acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(I) and 1120(J), which may be positioned on a corresponding neckband 1105.

In some embodiments, one or more of acoustic transducers 1120(A)-(J) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120 (A) and 1120(B) may be connected to augmented-reality system 1100 via a wireless connection (e.g., a BLUETOOTH connection). In still other embodiments, acoustic transducers 1120(A) and 1120(B) may not be used at all in conjunction with augmented-reality system 1100.

Acoustic transducers 1120 on frame 1110 may be positioned in a variety of different ways, including along the length of the temples, across the bridge, above or below display devices 1115(A) and 1115(B), or some combination thereof. Acoustic transducers 1120 may also be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(I) and 1120(J) of neckband 1105 may be configured to detect sound and convert the detected sound into an electronic format (analog or digital). In the embodiment of FIG. 11, acoustic transducers 1120(I) and 1120(J) may be positioned on neckband 1105, thereby increasing the distance between the neckband acoustic transducers 1120(I) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1100 and/or virtual-reality system 1200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multilens configuration that produces so-called barrel distortion to nullify pincushion distortion).

In addition to or instead of using display screens, some of the artificial-reality systems described herein may include one or more projection systems. For example, display devices in augmented-reality system 1100 and/or virtual-reality system 1200 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1100 and 1200 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 13 illustrates a vibrotactile system 1300 in the form of a wearable glove (haptic device 1310) and wristband (haptic device 1320). Haptic device 1310 and haptic device 1320 are shown as examples of wearable devices that include a flexible, wearable textile material 1330 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1340 may be positioned at least partially within one or more corresponding pockets formed in textile material 1330 of vibrotactile system 1300. Vibrotactile devices 1340 may be positioned in locations to provide a vibrating sensation (e.g., haptic feedback) to a user of vibrotactile system 1300. For example, vibrotactile devices 1340 may be positioned against the user's finger(s), thumb, or wrist, as shown in FIG. 13. Vibrotactile devices 1340 may, in some examples, be sufficiently flexible to conform to or bend with the user's corresponding body part(s).

A power source 1350 (e.g., a battery) for applying a voltage to the vibrotactile devices 1340 for activation thereof may be electrically coupled to vibrotactile devices 1340, such as via conductive wiring 1352. In some examples, each of vibrotactile devices 1340 may be independently electrically coupled to power source 1350 for individual activation. In some embodiments, a processor 1360 may be operatively coupled to power source 1350 and configured (e.g., programmed) to control activation of vibrotactile devices 1340.

Vibrotactile system 1300 may be implemented in a variety of ways. In some examples, vibrotactile system 1300 may be a standalone system with integral subsystems and components for operation independent of other devices and systems. As another example, vibrotactile system 1300 may be configured for interaction with another device or system 1370. For example, vibrotactile system 1300 may, in some examples, include a communications interface 1380 for receiving and/or sending signals to the other device or system 1370. The other device or system 1370 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1380 may enable communications between vibrotactile system 1300 and the other device or system 1370 via a wireless (e.g., Wi-Fi, BLUETOOTH, cellular, radio, etc.) link or a wired link. If present, communications interface 1380 may be in communication with processor 1360, such as to provide a signal to processor 1360 to activate or deactivate one or more of the vibrotactile devices 1340.

Vibrotactile system 1300 may optionally include other subsystems and components, such as touch-sensitive pads 1390, pressure sensors, motion sensors, position sensors, lighting elements, and/or user interface elements (e.g., an on/off button, a vibration control element, etc.). During use, vibrotactile devices 1340 may be configured to be activated for a variety of different reasons, such as in response to the user's interaction with user interface elements, a signal from the motion or position sensors, a signal from the touch-sensitive pads 1390, a signal from the pressure sensors, a signal from the other device or system 1370, etc.

Although power source 1350, processor 1360, and communications interface 1380 are illustrated in FIG. 13 as being positioned in haptic device 1320, the present disclosure is not so limited. For example, one or more of power source 1350, processor 1360, or communications interface 1380 may be positioned within haptic device 1310 or within another wearable textile.

Figure 14:
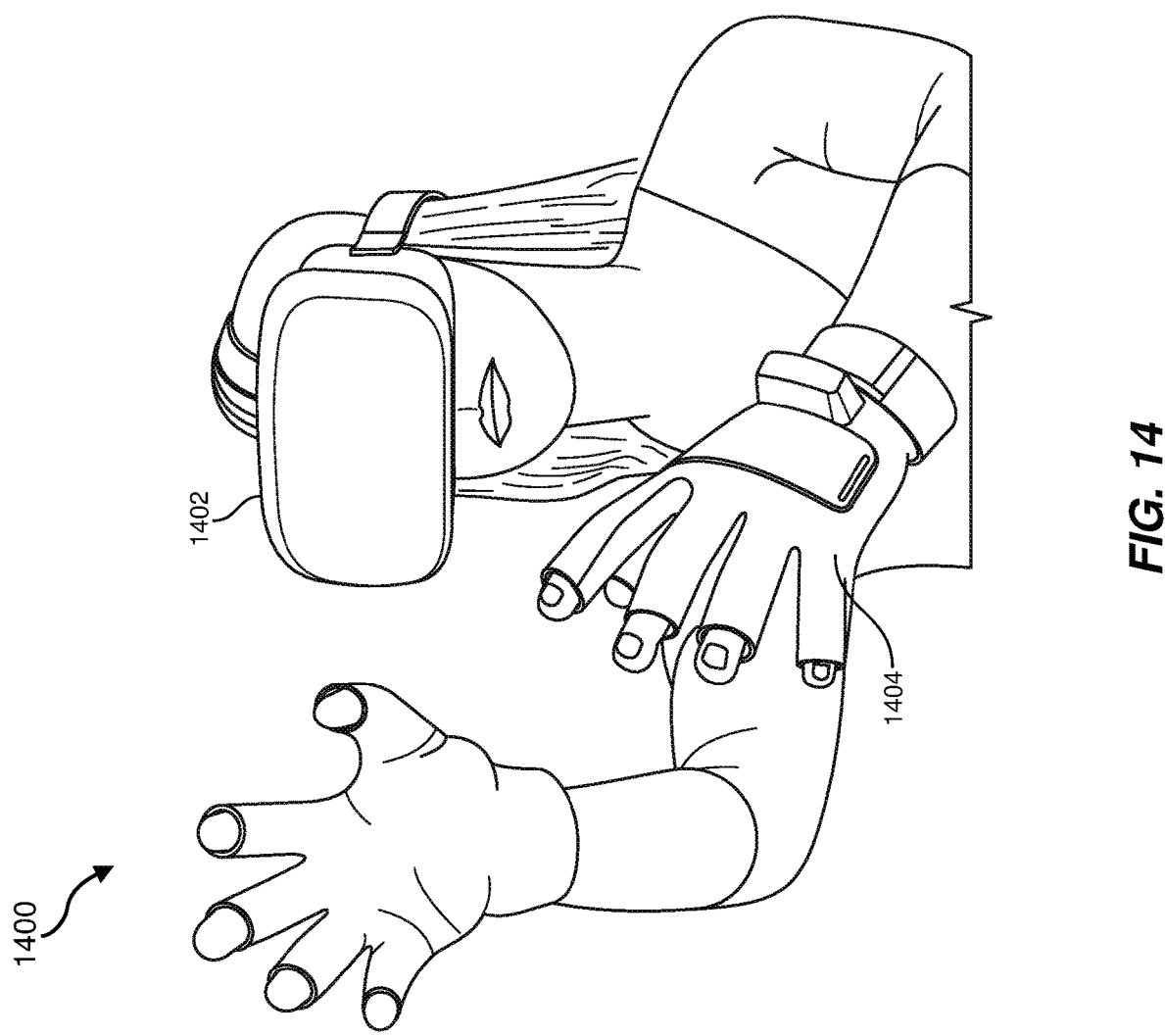
FIG. 14 is an illustration of an exemplary virtual-reality environment according to embodiments of this disclosure.

Haptic wearables, such as those shown in and described in connection with FIG. 13, may be implemented in a variety of types of artificial-reality systems and environments. FIG. 14 shows an example artificial-reality environment 1400 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1402 generally represents any type or form of virtual-reality system, such as virtual-reality system 1200 in FIG. 12. Haptic device 1404 generally represents any type or form of wearable device, worn by a user of an artificial-reality system, that provides haptic feedback to the user to give the user the perception that he or she is physically engaging with a virtual object. In some embodiments, haptic device 1404 may provide haptic feedback by applying vibration, motion, and/or force to the user. For example, haptic device 1404 may limit or augment a user's movement. To give a specific example, haptic device 1404 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1404 to send action requests to a console. Examples of action requests include, without limitation, requests to start an application and/or end the application and/or requests to perform a particular action within the application.

While haptic interfaces may be used with virtual-reality systems, as shown in FIG. 14, haptic interfaces may also be used with augmented-reality systems, as shown in FIG. 15. FIG. 15 is a perspective view of a user 1510 interacting with an augmented-reality system 1500. In this example, user 1510 may wear a pair of augmented-reality glasses 1520 that may have one or more displays 1522 and that are paired with a haptic device 1530. In this example, haptic device 1530 may be a wristband that includes a plurality of band elements 1532 and a tensioning mechanism 1534 that connects band elements 1532 to one another.

One or more of band elements 1532 may include any type or form of actuator suitable for providing haptic feedback. For example, one or more of band elements 1532 may be configured to provide one or more of various types of cutaneous feedback, including vibration, force, traction, texture, and/or temperature. To provide such feedback, band elements 1532 may include one or more of various types of actuators. In one example, each of band elements 1532 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1310, 1320, 1404, and 1530 may include any suitable number and/or type of haptic transducer, sensor, and/or feedback mechanism. For example, haptic devices 1310, 1320, 1404, and 1530 may include one or more mechanical transducers, piezoelectric transducers, and/or fluidic transducers. Haptic devices 1310, 1320, 1404, and 1530 may also include various combinations of different types and forms of transducers that work together or independently to enhance a user's artificial-reality experience. In one example, each of band elements 1532 of haptic device 1530 may include a vibrotactor (e.g., a vibrotactile actuator) configured to vibrate in unison or independently to provide one or more of various types of haptic sensations to a user.

Figure 16A:
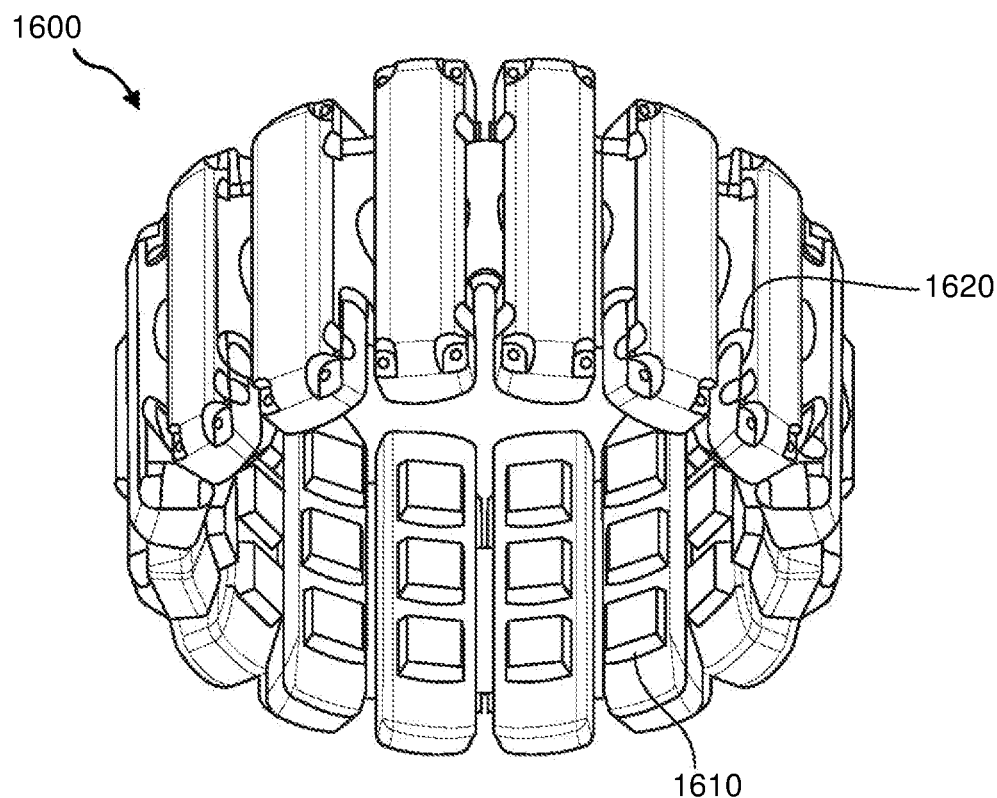
FIGS. 16A and 16B are illustrations of an exemplary human-machine interface configured to be worn around a user's lower arm or wrist.
Figure 16B:
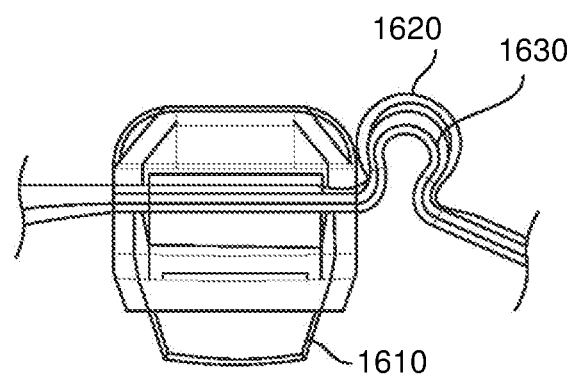

FIG. 16A illustrates an exemplary human-machine interface (also referred to herein as an EMG control interface) configured to be worn around a user's lower arm or wrist as a wearable system 1600. In this example, wearable system 1600 may include sixteen neuromuscular sensors 1610 (e.g., EMG sensors) arranged circumferentially around an elastic band 1620 with an interior surface 1630 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 16B illustrates a cross-sectional view through one of the sensors of the wearable device shown in FIG. 16A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1610 is discussed in more detail below with reference to FIGS. 17A and 17B.

Figure 17A:
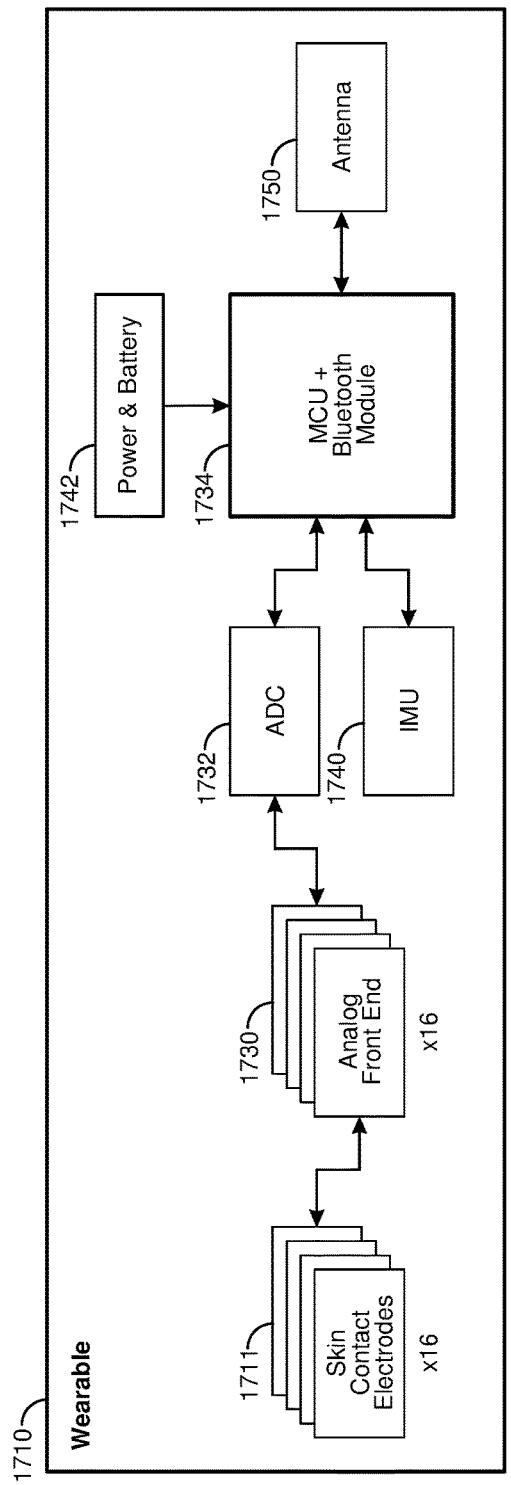
FIGS. 17A and 17B are illustrations of an exemplary schematic diagram with internal components of a wearable system.
Figure 17B:
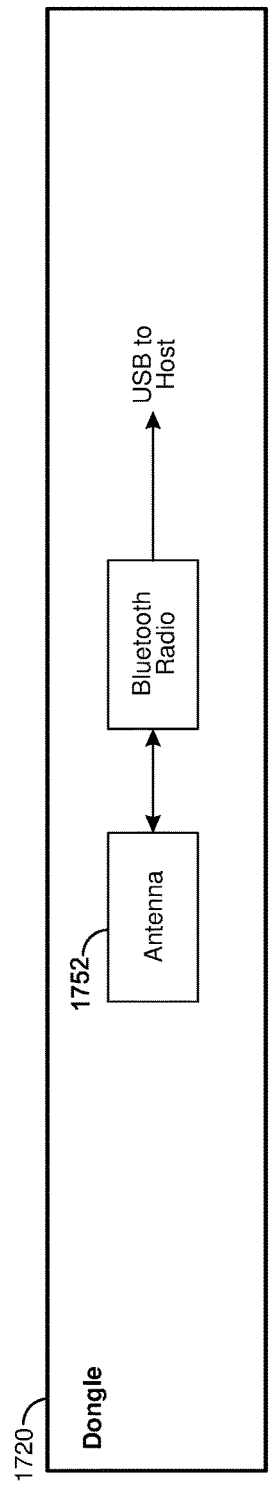

FIGS. 17A and 17B illustrate an exemplary schematic diagram with internal components of a wearable system with EMG sensors. As shown, the wearable system may include a wearable portion 1710 (FIG. 17A) and a dongle portion 1720 (FIG. 17B) in communication with the wearable portion 1710 (e.g., via BLUETOOTH or another suitable wireless communication technology). As shown in FIG. 17A, the wearable portion 1710 may include skin contact electrodes 1711, examples of which are described in connection with FIGS. 16A and 16B. The output of the skin contact electrodes 1711 may be provided to analog front end 1730, which may be configured to perform analog processing (e.g., amplification, noise reduction, filtering, etc.) on the recorded signals. The processed analog signals may then be provided to analog-to-digital converter 1732, which may convert the analog signals to digital signals that can be processed by one or more computer processors. An example of a computer processor that may be used in accordance with some embodiments is microcontroller (MCU) 1734, illustrated in FIG. 17A. As shown, MCU 1734 may also include inputs from other sensors (e.g., IMU sensor 1740), and power and battery module 1742. The output of the processing performed by MCU 1734 may be provided to antenna 1750 for transmission to dongle portion 1720 shown in FIG. 17B.

Dongle portion 1720 may include antenna 1752, which may be configured to communicate with antenna 1750 included as part of wearable portion 1710. Communication between antennas 1750 and 1752 may occur using any suitable wireless technology and protocol, non-limiting examples of which include radiofrequency signaling and BLUETOOTH. As shown, the signals received by antenna 1752 of dongle portion 1720 may be provided to a host computer for further processing, display, and/or for effecting control of a particular physical or virtual object or objects.

Although the examples provided with reference to FIGS. 16A-16B and FIGS. 17A-17B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform an action, use the result of the transformation to perform an action, and/or store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   detecting, by a computing system, a gesture that appears to be intended to trigger a response by the computing system;
   identifying, by the computing system for performing on the computing system, an action that is based on the detected gesture;
   determining, by the computing system, an estimate of a temporal cost of performing the action and an estimate of a temporal cost of not performing the action;
   identifying, by the computing system, a context in which the gesture was performed; and
   adjusting a threshold for determining whether to trigger the response to the gesture in a manner that causes the computing system to perform the action, the adjusting based on at least one of the context in which the gesture was performed, the estimate of the temporal cost of performing the action, and the estimate of the temporal cost of not performing the action.

2. The computer-implemented method of claim 1, wherein:
   the estimate of the temporal cost of performing the action comprises an estimated time involved in undoing the action; and
   adjusting the threshold for determining whether to trigger the response to the gesture is based on the estimated time involved in undoing the action if the gesture was not intended to trigger the response and the action was performed.

3. The computer-implemented method of claim 1, wherein:
   the estimate of the temporal cost of not performing the action comprises an estimated time involved in recovering from not performing the action; and
   adjusting a threshold for determining whether to trigger the response to the gesture is based on an estimated time involved in recovering from not performing the action if the gesture was intended to trigger the response and the action was not performed.

4. The computer-implemented method of claim 1, further comprising calculating a recognizer score that indicates a clarity of the gesture via a probability that the computing system has accurately interpreted the gesture, wherein:
   the context in which the gesture was performed comprises the clarity of the gesture; and
   adjusting the threshold for determining whether to trigger the response to the gesture is based on the probability that the gesture is intended to trigger the response.

5. The computer-implemented method of claim 1, further comprising determining whether a user who performed the gesture is involved in multitasking on the computing system, wherein:
   the context in which the gesture was performed comprises a degree of the multitasking occurring when the gesture is detected; and
   adjusting the threshold for determining whether to trigger the response to the gesture is based on the degree of the multitasking occurring when the gesture is detected by the computing system.

6. The computer-implemented method of claim 5, wherein the degree of multitasking is based on at least one of a number of applications running on the computing system or a number of activities being performed by a user of the computing system.

7. The computer-implemented method of claim 1, wherein:
   the context in which the gesture was performed comprises an amount of time involved in detecting the gesture; and
   adjusting the threshold for determining whether to trigger the response to the gesture is based on the amount of time involved in detecting the gesture.

8. The computer-implemented method of claim 7, wherein the amount of time involved in detecting the gesture is based on at least one of an application running on the computing system, an activity being performed by a user of the computing system, or a speed of a behavior of a user of the computing system.

9. The computer-implemented method of claim 1, wherein:
   detecting the gesture comprises detecting one of a sequence of gestures intended to trigger the response by the computing system; and
   performing the action based on the detected gesture comprises performing the action based on the sequence of gestures.

10. The computer-implemented method of claim 1, wherein the context in which the gesture was performed comprises one or more of:
    a time-of-day;
    a level of ambient lighting;
    a state of the computing system; or
    a location where the gesture was performed.

11. A system comprising:
at least one physical processor; and
physical memory comprising computer-executable instructions that, when executed by the physical processor, cause the physical processor to:
  detect, by a computing device, a gesture that appears to be intended to trigger a response by the system;
  identify, by the computing device for performing on the computing device, an action that is based on the detected gesture;
  determine, by the computing device, an estimate of a temporal cost of performing the action and an estimate of a temporal cost of not performing the action;
  identify, by the computing device, a context in which the gesture was performed; and
  adjust a threshold for determining whether to trigger the response to the gesture in a manner that causes the system to perform the action, the adjusting based on at least one of the context in which the gesture was performed, the estimate of the temporal cost of performing the action, and the estimate of the temporal cost of not performing the action.

12. The system of claim 11, wherein:
the estimate of the temporal cost of performing the action comprises an estimated time involved in recovering from performing the action; and
adjusting the threshold for determining whether to trigger the response to the gesture is based on the estimated time involved in recovering from performing the action if the gesture was not intended to trigger the response and the action was performed.

13. The system of claim 11, wherein:
the estimate of the temporal cost of not performing the action comprises an estimated time involved in recovering from not performing the action; and
adjusting a threshold for determining whether to trigger the response to the gesture is based on an estimated time involved in recovering from not performing the action if the gesture was intended to trigger the response and the action was not performed.

14. The system of claim 11, further comprising computer-executable instructions that, when executed by the physical processor, cause the physical processor to calculate a recognizer score that indicates a clarity of the gesture via a probability that the system has accurately interpreted the gesture, wherein:
the context in which the gesture was performed comprises the clarity of the gesture; and
adjusting the threshold for determining whether to trigger the response to the gesture is based on the probability that the gesture is intended to trigger the response.

15. The system of claim 11, further comprising computer-executable instructions that, when executed by the physical processor, cause the physical processor to determine whether a user who performed the gesture is involved in multitasking on the system, wherein:
  the context in which the gesture was performed comprises a degree of the multitasking occurring when the gesture is detected; and
  adjusting the threshold for determining whether to trigger the response to the gesture is based on the degree of the multitasking occurring when the gesture is detected by the system.

16. The system of claim 15, wherein the degree of multitasking is based on at least one of a number of applications running on the system or a number of activities being performed by a user of the system.

17. The system of claim 11, wherein:
  the context in which the gesture was performed comprises an amount of time involved in detecting the gesture; and
  adjusting the threshold for determining whether to trigger the response to the gesture is based on the amount of time involved in detecting the gesture.

18. The system of claim 17, wherein the amount of time involved in detecting the gesture is based on at least one of an application running on the system, an activity being performed by a user of the system, or a speed of a behavior of a user of the system.

19. The system of claim 11, wherein:
  detecting the gesture comprises detecting one of a sequence of gestures intended to trigger the response by the system; and
  performing the action based on the detected gesture comprises performing the action based on the sequence of gestures.

20. A non-transitory computer-readable medium comprising one or more computer-executable instructions that, when executed by at least one processor of a computing device of a computing system, cause the computing device to:
  identify, for performing on the computing device, an action that is based on a detected gesture;
  determine an estimate of a temporal cost of performing the action and an estimate of a temporal cost of not performing the action;
  detect a gesture that appears to be intended to trigger a response by the computing system;
  identify, by the computing device, a context in which the gesture was performed; and
  adjust a threshold for determining whether to trigger the response to the gesture in a manner that causes the computing system to perform the action, the adjusting based on at least one of the context in which the gesture was performed, the estimate of the temporal cost of performing the action, and the estimate of the temporal cost of not performing the action.

* * * * *